(12) United States Patent
Taki et al.

(10) Patent No.: US 10,321,008 B2
(45) Date of Patent: Jun. 11, 2019

(54) PRESENTATION CONTROL DEVICE FOR CONTROLLING PRESENTATION CORRESPONDING TO RECOGNIZED TARGET

(71) Applicant: SONY CORPORATION, Tokyo (JP)

(72) Inventors: Yuhei Taki, Kanagawa (JP); Hikotatsu Chin, Tokyo (JP); Yusuke Nakagawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 529 days.

(21) Appl. No.: 14/609,763

(22) Filed: Jan. 30, 2015

(65) Prior Publication Data

US 2015/0229908 A1 Aug. 13, 2015

(30) Foreign Application Priority Data

Feb. 10, 2014 (JP) .................. 2014-023302

(51) Int. Cl.
*H04N 1/32* (2006.01)
*H04N 5/374* (2011.01)
*H04N 5/365* (2011.01)
*G06F 3/01* (2006.01)
*G06T 19/00* (2011.01)
*H04N 13/20* (2018.01)
*H04N 13/296* (2018.01)
*H04N 13/30* (2018.01)
*G02B 27/22* (2018.01)
*G06F 3/03* (2006.01)
*H04M 1/725* (2006.01)

(52) U.S. Cl.
CPC ......... *H04N 1/32112* (2013.01); *G06F 3/011* (2013.01); *G06F 3/016* (2013.01); *G06F 3/017* (2013.01); *G06F 3/0304* (2013.01); *H04M 1/72519* (2013.01); *H04M 2250/52* (2013.01)

(58) Field of Classification Search
CPC .. H04N 13/0429; H04N 5/3658; H04N 5/374; H04N 1/32112; H04N 2013/0465; H04N 2213/007; H04N 2213/008; G06F 3/016
USPC .......................................... 348/46
See application file for complete search history.

(56) References Cited

U.S. PATENT DOCUMENTS

2004/0056870 A1* 3/2004 Shimoyama .......... G06T 19/006
345/629
2012/0056992 A1* 3/2012 Kuroda ................. G06T 19/006
348/46

(Continued)

FOREIGN PATENT DOCUMENTS

JP 2006-048443 A 2/2006

Primary Examiner — Hee-Yong Kim
(74) Attorney, Agent, or Firm — Chip Law Group

(57) ABSTRACT

There is provided a presentation control device including a determination section configured to determine whether a condition corresponding to a recognition target to be recognized on the basis of a photographed image is satisfied, and a presentation control section configured to allow presentation associated with the recognition target to be performed in a case where it is determined that the condition corresponding to the recognition target is satisfied. The condition corresponding to the recognition target includes a condition related to a state of a target user to whom a content of the presentation is to be transmitted.

17 Claims, 15 Drawing Sheets

(56) References Cited

U.S. PATENT DOCUMENTS

| | | | | |
|---|---|---|---|---|
| 2013/0273969 A1* | 10/2013 | Polimeno | ............ | G06K 9/2081 |
| | | | | 455/556.1 |
| 2015/0059002 A1* | 2/2015 | Balram | ................ | G06F 3/011 |
| | | | | 726/28 |
| 2015/0063640 A1* | 3/2015 | Anabuki | ............ | G06K 9/00771 |
| | | | | 382/103 |

* cited by examiner

FIG. 4

| A | B | C |
|---|---|---|
| | PRESENTATION TIMING / TRIGGER | PRESENTATION METHOD / PRESENTATION CONTENT |
| DURING DRIVING OF VEHICLE SUCH AS AUTOMOBILE AND BICYCLE | DISPLAY ALERT AT EDGE OF FIELD OF VIEW WHILE MOVEMENT IS STOPPED (SUCH AS WAITING FOR TRAFFIC LIGHT) | DISPLAY ALERT ICON AT SCREEN EDGE TO INFORM THAT THERE IS NOTICE INFORMATION FOR MAKING SAFE VIEWING CIRCUMSTANCE (SUCH AS PARKING CAR AT PARKING LOT). THEN ALLOW ICON TO BE SELECTED TO SHOW MISSING ARTICLE INFORMATION — C1 |
| DURING RIDE ON VEHICLE SUCH AS TRAIN AND BUS | IMMEDIATELY DISPLAY DISPLAY ALERT AT CONSPICUOUS POSITION (SUCH AS CENTER) IN FIELD OF VIEW | DISPLAY ICON AND NOTICE CONTENT TOGETHER IN FORM LIKE DIALOG BOX TO ENABLE INFORMATION TO BE VIEWED WITHOUT ANOTHER OPERATION — C2 |
| DURING HARD EXERCISE | IF NO HARD EXERCISE IS MEASURED FOR PREDETERMINED TIME (SUCH AS THREE MINUTES) BY ACCELERATION SENSOR, DISPLAY ALERT AT EDGE OF FIELD OF VIEW | DISPLAY ALERT ICON AT SCREEN EDGE TO DISPLAY INFORMATION SUCH AS TEXT INFORMATION AT SCREEN EDGE (ICON POSITION) AFTER PREDETERMINED TIME (Ex. THREE MINUTES) — C3 |
| DURING LIGHT EXERCISE (Ex. WALKING) | IMMEDIATELY DISPLAY DISPLAY ALERT AT EDGE OF FIELD OF VIEW | DISPLAY ALERT ICON AT SCREEN EDGE TO DISPLAY INFORMATION SUCH AS TEXT INFORMATION AT SCREEN EDGE (ICON POSITION) AFTER PREDETERMINED TIME (Ex. THREE MINUTES) — C4 |
| ... | ... | ... |

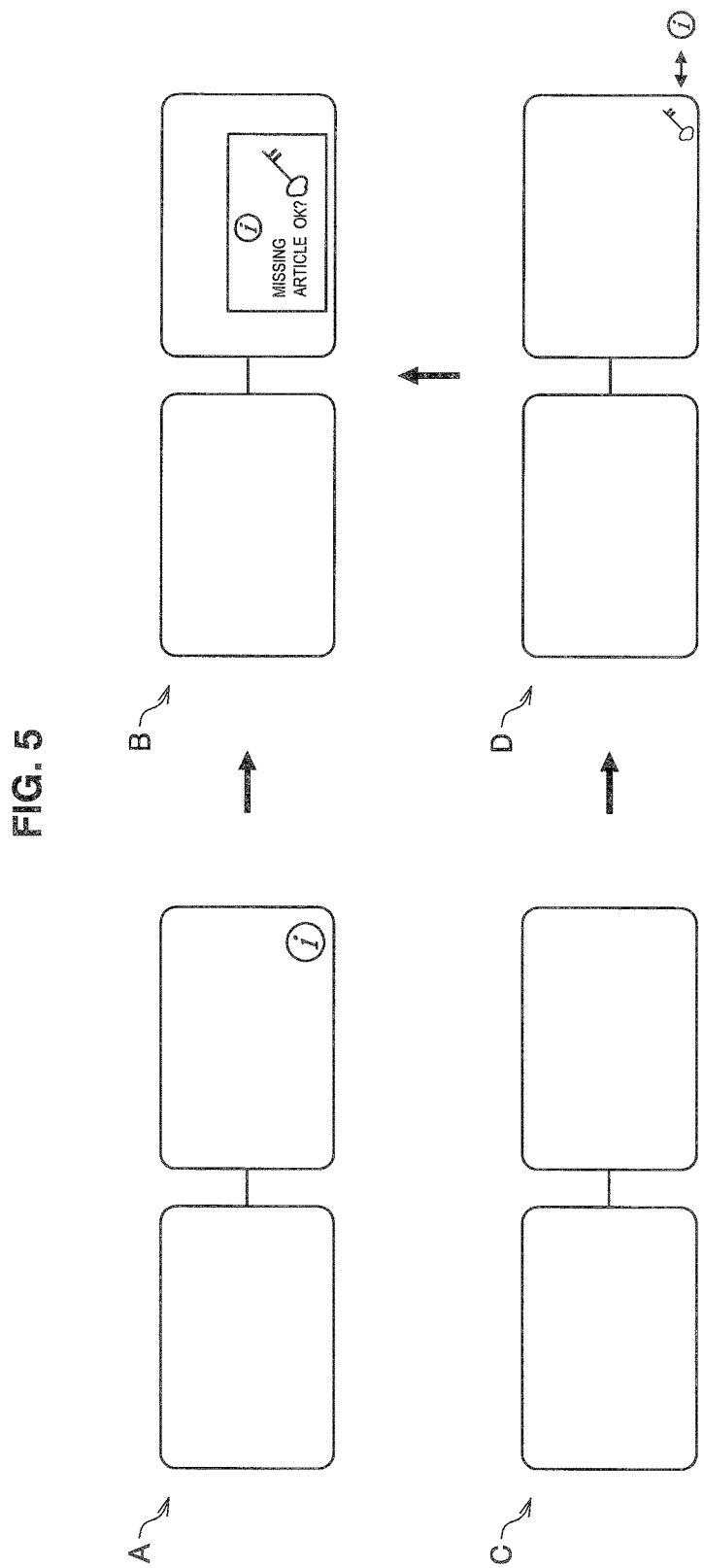

FIG. 7

| A | B | C | D |
|---|---|---|---|
| OBJECT CATEGORY | USER ACTION | CIRCUMSTANCE | PRESENTATION CONTENT |
| MULTIMEDIA (SUCH AS MUSIC, VIDEO, AND PHOTO) MULTIMEDIA ADVERTISEMENT, ETC. | HOLD WITH HAND | STAY HOME AWAY FROM HOME | REPRODUCING FREQUENCY / LAST VIEWED SCENE RELATED TWEET / WORD OF MOUTH / PRICE (D1) |
| FOOD ITEM FOR COOKING (Ex. VEGETABLE AND MEAT) | HOLD WITH HAND COME INTO VIEW | • AT HOME<br>• WHETHER SAME FOOD ITEM IS AT HOME | RESIDUAL QUANTITY OF SAME FOOD ITEM AT HOME OR IMAGE DISPLAY RECIPE USING FOOD ITEM ABOVE<br>FUTURE SEASON WHEN FOOD ITEM ABOVE IS NECESSARY FROM HISTORY (D2) |
| FOOD ITEM FOR NON-COOKING (Ex. MILK, COFFEE, AND SWEETENED BUN THAT ARE EDIBLE WITHOUT COOKING) | HOLD WITH HAND COME INTO VIEW | • AT HOME<br>• WHETHER SAME ARTICLE IS AT HOME<br>• CURRENT TIME | RESIDUAL QUANTITY OF SAME FOOD ITEM AT HOME OR IMAGE DISPLAY INTAKE CALORIES PER DAY AND TOTAL CALORIES WHEN CONSUMING FOOD ITEM ABOVE<br>DETERMINE WHETHER INTAKE CALORIES ARE TOO MUCH<br>DETERMINE FROM CURRENT TIME WHETHER FOOD ITEM CAN BE CONSUMED<br>FUTURE SEASON WHEN FOOD ITEM ABOVE IS NECESSARY FROM HISTORY (D3) |
| PC | TURN ON PC | • CURRENT TIME | TOTAL TIME OF PC OPERATION<br>WHETHER RECOMMENDED USAGE TIME IS EXCEEDED<br>WHAT OPERATION IS PERFORMED LAST TIME<br>RUNNING STATE OF FRIEND'S PC (D4) |
| ... | ... | ... | ... |

FIG. 8

| A ~ OBJECT CATEGORY | B ~ USER ACTION | C ~ PRESENTATION CONTENT |
|---|---|---|
| ... | SPECIFIED GESTURE THAT IS NOT USUALLY USED<br>Ex. INDICATING OBJECT WITH THREE FINGERS<br>Ex. ENCLOSING OBJECT WHOSE INFORMATION IS WANTED TO BE SEEN IN CIRCLE FORMED BY BOTH HANDS | DISPLAY PRESENTATION CONTENT FOR EACH CATEGORY AS SHOWN IN COLUMN D IN FIG. 7 |
| | ... | ... |

PRESENTATION CONTROL DEVICE FOR CONTROLLING PRESENTATION CORRESPONDING TO RECOGNIZED TARGET

CROSS REFERENCE TO RELATED APPLICATIONS

This application claims the benefit of Japanese Priority Patent Application JP 2014-023302 filed Feb. 10, 2014, the entire contents of which are incorporated herein by reference.

BACKGROUND

The present disclosure relates to a presentation control device, a method of controlling presentation, and a program.

There is known a technique of storing a photographed image in a recording medium as data showing a user history, such as life-log. In addition, there is developed a technique of performing presentation using information (data) showing a history stored in a recording medium, for example. There is provided a technique described in JP 2006-48443A as an example of a technique of performing presentation using information showing a history, for example.

SUMMARY

There are needs of performing presentation corresponding to a recognition target to be recognized on the basis of a photographed image (dynamic image or static image, hereinafter referred to as a "photographed image") for a target user to whom a content of the presentation is to be transmitted (hereinafter may be simply referred to as a "user"). In the technique described in JP 2006-48443A, for example, information on an article extracted by searching a database using an ID and a keyword is presented to a user. Unfortunately, even if the technique described in JP 2006-48443A is used, for example, there is little possibility that the needs described above are satisfied.

In an embodiment of the present disclosure, there is provided a presentation control device, a method of controlling presentation, and a program, which is new and improved, and is capable of performing presentation corresponding to a recognition target to be recognized on the basis of a photographed image for a user.

According to an embodiment of the present disclosure, there is provided a presentation control device including a determination section configured to determine whether a condition corresponding to a recognition target to be recognized on the basis of a photographed image is satisfied, and a presentation control section configured to allow presentation associated with the recognition target to be performed in a case where it is determined that the condition corresponding to the recognition target is satisfied. The condition corresponding to the recognition target includes a condition related to a state of a target user to whom a content of the presentation is to be transmitted.

According to another embodiment of the present disclosure, there is provided a method of controlling presentation, the method including determining whether a condition corresponding to a recognition target to be recognized on the basis of a photographed image is satisfied, and allowing presentation associated with the recognition target to be performed in a case where it is determined that the condition corresponding to the recognition target is satisfied. The condition corresponding to the recognition target includes a condition related to a state of a target user to whom a content of the presentation is to be transmitted.

According to still another embodiment of the present disclosure, there is provided a program allowing a computer to execute determining whether a condition corresponding to a recognition target to be recognized on the basis of a photographed image is satisfied, and allowing presentation associated with the recognition target to be performed in a case where it is determined that the condition corresponding to the recognition target is satisfied. The condition corresponding to the recognition target includes a condition related to a state of a target user to whom a content of the presentation is to be transmitted.

According to one or more embodiments of the present disclosure, it is possible to perform presentation corresponding to a recognition target to be recognized on the basis of a photographed image for a user.

BRIEF DESCRIPTION OF THE DRAWINGS

FIG. 4 is an illustration for describing a second example of the processing according to the method of controlling presentation, in accordance with the present embodiment;

FIG. 5 is an illustration for describing a second example of the processing according to the method of controlling presentation, in accordance with the present embodiment;

FIG. 7 is an illustration for describing a fourth example of the processing according to the method of controlling presentation, in accordance with the present embodiment;

FIG. 8 is an illustration for describing a fourth example of the processing according to the method of controlling presentation, in accordance with the present embodiment;

DETAILED DESCRIPTION OF THE EMBODIMENT(S)

Figure 1:
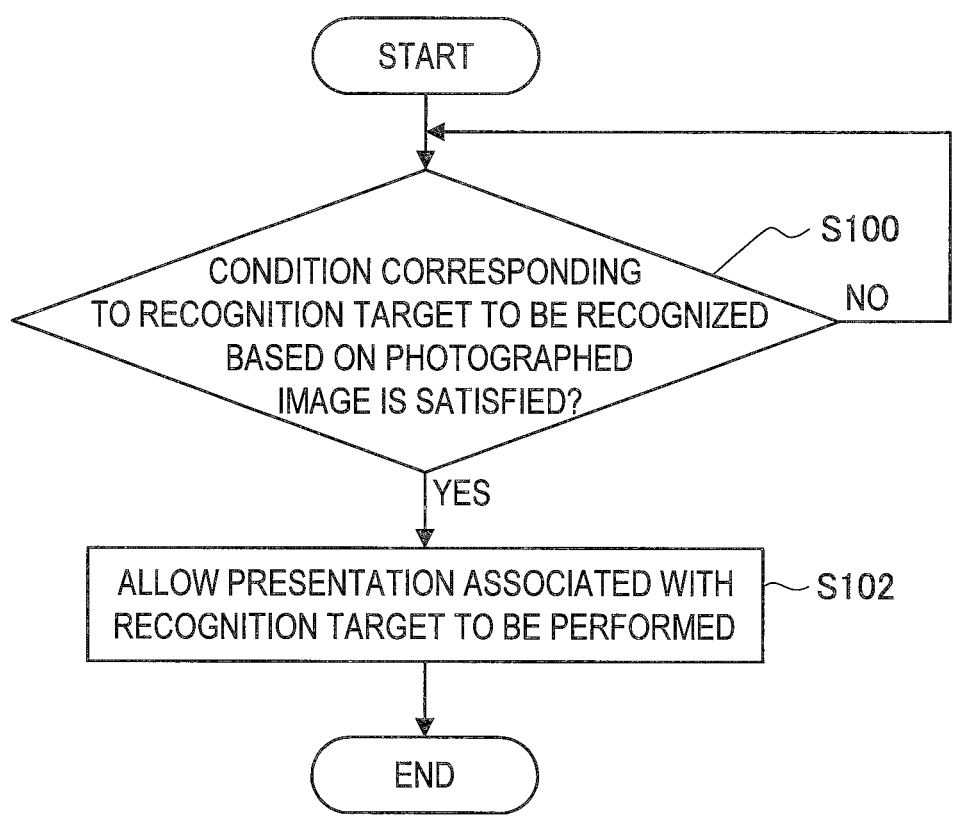
FIG. 1 is a flow chart showing an example of processing according to a method of controlling presentation, in accordance with the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, hereinafter the embodiment will be described in the order shown below:
1. A method of controlling presentation, in accordance with the present embodiment
2. A presentation control device in accordance with the present embodiment
3. A presentation control system in accordance with the present embodiment
4. A program in accordance with the present embodiment (A Method of Controlling Presentation, in Accordance with the Present Embodiment)
An Outline of the Method of Controlling Presentation in Accordance with the Present Embodiment Before a configuration of the presentation control device in accordance with the present embodiment is described, first, the method of controlling presentation, in accordance with the present embodiment, will be described. Hereinafter, the method of controlling presentation, in accordance with the present embodiment, will be described by an example in which the presentation control device in accordance with the present embodiment performs processing according to the method of controlling presentation, in accordance with the present embodiment.

If presentation corresponding to a recognition target to be recognized on the basis of a photographed image is performed for a user, it will be more possible that a more suitable presentation content is presented to a user at more suitable timing. In addition, if the more suitable presentation content is presented to a user at more suitable timing, it is expected that the convenience of the user who has received the presentation content can be further improved.

The presentation control device in accordance with the present embodiment determines whether a condition corresponding to a recognition target to be recognized on the basis of a photographed image is satisfied (determination processing). In a case where the presentation control device in accordance with the present embodiment determines that the condition corresponding to the recognition target is satisfied in the determination processing above, presentation associated with the recognition target is performed (presentation control processing).

A photographed image in accordance with the present embodiment is photographed with an imaging device composed of a lens of an optical system and an imaging element such as a complementary metal oxide semiconductor (CMOS), for example. The photographed image in accordance with the present embodiment is photographed with the imaging device constantly, regularly, or irregularly, for example. In addition, the photographed image in accordance with the present embodiment may be an image photographed with each of a plurality of imaging devices corresponding to respective different users, for example.

The photographed image in accordance with the present embodiment is stored in the following: a storage unit (described later) provided in the presentation control device in accordance with the present embodiment; a recording medium connected to the presentation control device in accordance with the present embodiment; a recording medium provided in an external device provided in the presentation control device in accordance with the present embodiment; a recording medium connected to the external device, and the like, for example. In a case where a photographed image stored in the storage unit (described later) and the like is processed, the presentation control device in accordance with the present embodiment reads out a photographed image stored in the storage unit (described later), for example, to process the photographed image read out.

The imaging device in accordance with the present embodiment includes an imaging device constituting an imaging unit (described later) provided in the presentation control device in accordance with the present embodiment, an imaging device connected to the presentation control device in accordance with the present embodiment, an imaging device provided in an external device of the presentation control device in accordance with the present embodiment, an imaging device connected to the external device, and the like, for example.

The imaging device in accordance with the present embodiment may be a device worn by a user, for example. In a case where the imaging device in accordance with the present embodiment is worn by a user, the imaging device in accordance with the present embodiment is provided in or connected to a wearable device, such as a display device that is worn by a user so as to position a screen in front of the user, such as a head mounted display (hereinafter referred to as an "HMD"), and a watch type device, for example. The HMD in accordance with the present embodiment includes a transmission-type HMD, and a shield-type HMD, for example. In addition, in a case where the imaging device in accordance with the present embodiment is worn by a user, the photographed image in accordance with the present embodiment indicates an image photographed with an imaging device worn by one user, or an image photographed with each of a plurality of imaging devices worn by respective different users, for example.

The recognition target to be recognized on the basis of a photographed image, in accordance with the present embodiment, includes an object included in the photographed image, a combination of a plurality of objects, a space included in the photographed image, and the like, for example. The presentation control device in accordance with the present embodiment recognizes the recognition target in accordance with the present embodiment from a photographed image by using any recognition technique capable of recognizing a specific object and the like from an image, for example.

In addition, a presentation method associated with the recognition target in accordance with the present embodiment includes a visual presentation method using a character and an image, an auditory presentation method using voice (including music), a tactile presentation method using vibration and the like, a presentation method combining two or more presentation methods above, and the like, for example.

The presentation control device in accordance with the present embodiment, for example, transmits a control signal of controlling presentation and data (such as image data, voice data, vibration pattern data) showing a presentation content to a presentation device capable of performing presentation corresponding to a presentation method to allow the presentation device to perform presentation associated with a recognition target. The presentation device in accordance with the present embodiment includes a presentation device constituting a presentation unit (described later) provided in the presentation control device in accordance with the present embodiment, a presentation device connected to the presentation control device in accordance with the present embodiment, a presentation device provided in an external device of the presentation control device in accordance with the present embodiment, a presentation device connected to the external device, and the like, for example. In addition, the presentation device in accordance with the present embodiment includes a display device (an example of a presentation device capable of performing visual presentation method), a speaker (an example of a presentation device capable of performing an auditory presentation method), a vibrator (an example of a presentation device capable of performing tactile presentation method), and the like, for example.

FIG. 1 is a flow chart showing an example of processing according to a method of controlling presentation, in accordance with the present embodiment.

In the flow chart, processing at a step S100 shown in FIG. 1 corresponds to the determination processing in accordance with the present embodiment, and processing at a step S102 shown in FIG. 1 corresponds to the presentation control processing in accordance with the present embodiment.

The presentation control device in accordance with the present embodiment determines whether a condition corresponding to a recognition target to be recognized is satisfied, or not on the basis of a photographed image (S100). Each of specific examples of the recognition target and the condition corresponding to the recognition target, in accordance with the present embodiment, will be described later.

In the step S100, in a case where it is not determined that presentation satisfies the condition corresponding to the recognition target, the presentation control device in accordance with the present embodiment does not perform processing until it is determined that presentation satisfies the condition corresponding to the recognition target.

In addition, in the step S100, in a case where it is determined that the presentation satisfies the condition corresponding to the recognition target, the presentation control device in accordance with the present embodiment allows presentation associated with the recognition target to be performed (S102). The presentation control device in accordance with the present embodiment allows presentation to be performed by using a presentation method and presentation timing corresponding to the condition determined to be satisfied at the step S100 for a user so that presentation associated with the recognition target is performed, for example. An example of the presentation associated with the recognition target in accordance with the present embodiment will be described later.

For example, as shown in FIG. 1, the presentation control device in accordance with the present embodiment determines whether the condition corresponding to the recognition target to be recognized is satisfied on the basis of a photographed image. In a case where it is determined that the condition corresponding to the recognition target is satisfied, the presentation associated with the recognition target is performed.

Thus, the presentation control device in accordance with the present embodiment enables the presentation, corresponding to the recognition target to be recognized on the basis of the photographed image, to be performed for a user. In addition, the presentation corresponding to the recognition target to be recognized on the basis of the photographed image is performed for the user so that convenience of the user who has received the presentation content can be improved.

(2) A Specific Example of the Processing According to the Method of Controlling Presentation in Accordance with the Present Embodiment.

Next, the specific example of the processing according to the method of controlling presentation in accordance with the present embodiment described above will be described.

(2-1) First Example of the Processing According to the Method of Controlling Presentation in Accordance with the Present Embodiment the Method of Controlling Presentation in Accordance with the Present Embodiment: An Example of Realizing Presentation of a Place that is Physically Shielded, and the Like The presentation control device in accordance with the present embodiment allows information on a place and an object that are physically shielded, and information on an object placed away from a user, for example, to be presented to the user.

There is given a specific example in which, in a case where a refrigerator with a closed door is detected from photographed images acquired newly, for example, the presentation control device in accordance with the present embodiment allows a presentation content based on the latest photographed image in photographed images in which the inside of the refrigerator is photographed to be presented to a user. The presentation control device in accordance with the present embodiment allows an image formed by synthesizing an image of the refrigerator with a closed door and the latest photographed image in which the inside of the refrigerator is photographed, and the latest photographed image in which the inside of the refrigerator is photographed, for example, to be presented to the user (an example of the presentation associated with the recognition target in accordance with the present embodiment). In addition, the presentation control device in accordance with the present embodiment may present an object detected from the latest photographed image in which the inside of the refrigerator is photographed, for example, to a user by using a character and a voice (another example of the presentation associated with the recognition target in accordance with the present embodiment).

As described above, the presentation content based on the latest photographed image in which the inside of the refrigerator is photographed is presented to a user, so that the presentation control device in accordance with the present embodiment enables the user to recognize a state inside the refrigerator with a closed door (an example of a place that is physically shielded).

The latest photographed image in which the inside of the refrigerator is photographed, described above, includes a photographed image photographed with an imaging device (such as an imaging device worn by the user) corresponding to a target user to whom a content of the presentation is to be transmitted, for example. However, the latest photographed image in accordance with the present embodiment is not limited to the image described above. For example, the latest photographed image in which the inside of the refrigerator is photographed, described above, may be a photographed image photographed with an imaging device corresponding to a user different from the target user to whom a content of the presentation is to be transmitted.

As the latest photographed image in which the inside of the refrigerator is photographed, described above, in a case where there is allowed a photographed image photographed with an imaging device corresponding to a user different from the target user to whom a content of the presentation is to be transmitted, it will be more possible that the presentation control device in accordance with the present embodiment can perform processing by using the most latest photographed image. Thus, as the latest photographed image in which the inside of the refrigerator is photographed, described above, in a case where there is allowed a photographed image photographed with the imaging device corresponding to the user different from the target user to whom a content of the presentation is to be transmitted, the presentation control device in accordance with the present embodiment enables a presentation content including more fresh information to be presented a user.

As described above, the presentation control device in accordance with the present embodiment uses a photographed image photographed with an imaging device corresponding to a user different from the target user to whom a content of the presentation is to be transmitted to perform processing, so that a more fresh presentation content related to an object and a place shared by a plurality of users can be shared by the plurality of users.

(2-1-1) An Example of Determination Processing in Accordance with the First Example.

In a case where processing in accordance with the first example is realized, the presentation control device in accordance with the present embodiment determines whether a predetermined object is detected from a photographed image (an example of a condition corresponding to the recognition target in accordance with the present embodiment), for example. In a case where a specific example of the processing in accordance with the first example described above is realized, the presentation control device in accordance with the present embodiment determines that the condition corresponding to the recognition target in accordance with the present embodiment is satisfied in a case where a refrigerator (an example of a predetermined object) is detected from the photographed image, for example.

The condition corresponding to the recognition target in accordance with the present embodiment in the processing in accordance with the first example is not limited to that the predetermined object is detected from the photographed image. For example, the presentation control device in accordance with the present embodiment can further set detection of a signal (such as an operation signal based on user operation) of starting processing of detecting the predetermined object from the photographed image as the condition corresponding to the recognition target in accordance with the present embodiment.

(2-1-2) An Example of Presentation Control Processing in Accordance with the First Example.

In a case where the refrigerator is detected from the photographed image (in a case where it is determined that the condition corresponding to the recognition target in accordance with the present embodiment is satisfied), the presentation control device in accordance with the present embodiment allows presentation corresponding to the condition corresponding to the recognition target that is determined to be satisfied to be performed. For example, in a case where the refrigerator is detected form the photographed image, the presentation control device in accordance with the present embodiment allows an image formed by synthesizing an image of the refrigerator with a closed door and the latest photographed image in which the inside of the refrigerator is photographed, and the like, to be presented to a user.

The presentation control device in accordance with the present embodiment performs processing such as described above, as processing in accordance with the first example.

An example of the processing in accordance with the first example is not limited to the above.

For example, if the presentation control device in accordance with the present embodiment performs processing as with an example of allowing a user to recognize a state inside the refrigerator with a closed door (an example of a place that is physically shielded), it is also possible to present an object (an example of an object placed in a place that is physically shielded, or an object placed away from a user) that may exist indoors on a side across a wall of a room. The presentation control device in accordance with the present embodiment presents an image in which an object that may exist indoors on a side across a wall of a room is to be projected, for example, to a user (an example of the presentation associated with the recognition target in accordance with the present embodiment).

In addition, the presentation control device in accordance with the present embodiment can also search for a predetermined object and the like from the photographed image to present a search result, when a photographed image stored in the storage unit (described later) is processed, for example. The search result is presented to enable the presentation control device in accordance with the present embodiment to present information on an object placed in a place that is physically shielded and information on an object placed away from a user, for example, to the user.

Figure 2:
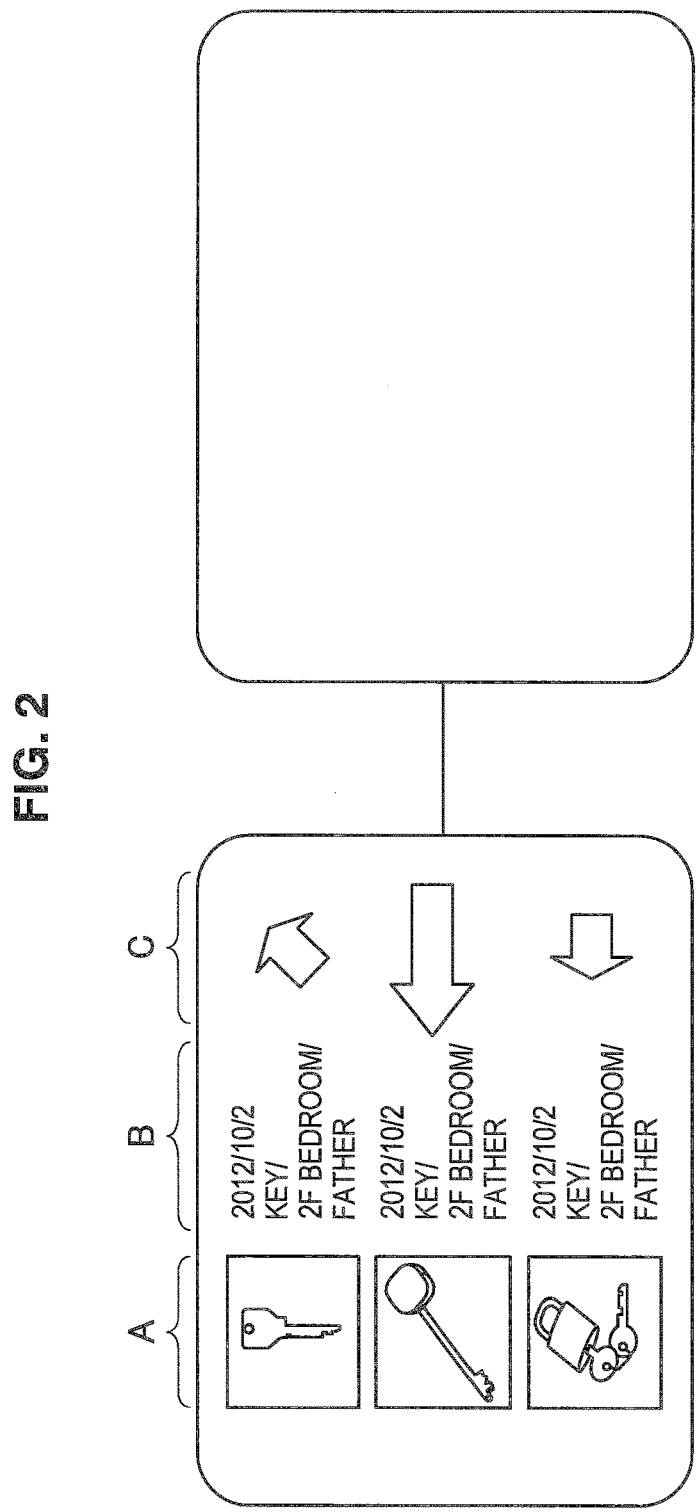
FIG. 2 is an illustration for describing a first example of the processing according to the method of controlling presentation, in accordance with the present embodiment.

FIG. 2 is an illustration for describing the first example of the processing according to the method of controlling presentation, in accordance with the present embodiment, and shows an example of presentation of a search result in a case where a key is retrieved from a photographed image as a predetermined object. Here, FIG. 2 shows a case where the search result is displayed in a screen of an eyeglasses type HMD (an example of a presentation device).

In a case where the key is retrieved from the photographed image as the predetermined object, the presentation control device in accordance with the present embodiment allows an image of the retrieved key (in a column A shown in FIG. 2) and information on the retrieved key (in a column B shown in FIG. 2) to be displayed in the screen, as shown in FIG. 2, for example.

In addition, as shown in a column C in FIG. 2, for example, the presentation control device in accordance with the present embodiment may present a direction in which the retrieved key exists. The presentation control device in accordance with the present embodiment presents the direction in which the retrieved key exists as shown in the column C in FIG. 2, for example, on the basis of positional information showing a position of a user, and positional information showing a position of the key (an example of a predetermined object) retrieved on the basis of the photographed image, for example.

The position of the user is detected by any position detecting device capable of specifying a position, such as a global positioning system (GPS) device, for example. The presentation control device in accordance with the present embodiment acquires positional information showing a position detected by the position detecting device to specify the position of the user. The position detecting device in accordance with the present embodiment is provided in a device that is worn or possessed by a user (hereinafter collectively called a "user device"), such as a wearable device worn by a user, a device possessed by a user (a communication device such as a mobile phone, for example), for example.

In addition, the position of the predetermined object searched on the basis of the photographed image is stored as meta data at the time of photographing with the imaging device, for example. The presentation control device in accordance with the present embodiment specifies the position of the predetermined object by reference to the meta data corresponding to the photographed image.

Although humans discard most of information within sight, information that was within sight at a certain time may sometimes be important for a user. For example, as shown in FIG. 2, a search result such as a predetermined object retrieved from the photographed image is presented so that a user can search for a predetermined object and the like from external storage (namely, a photographed image stored in the storage unit (described later) and the like) without depending on one's own memory. Accordingly, as shown in FIG. 2, for example, the search result such as the predetermined object retrieved from the photographed image is presented so that the user can manage an enormous amount of information with less effort.

(2-2) Second Example of the Processing According to the Method of Controlling Presentation in Accordance with the Present Embodiment: An Example of Realizing Presentation of a Lack of an Article that a User Possesses Next, processing capable of realizing presentation of a lack of an article that a user possesses (hereinafter may be referred to as a "missing article") will be described as the second example of the processing according to the method of controlling presentation in accordance with the present embodiment.

For example, in a case where a photographed image stored in the storage unit (described later) is photographed with an imaging device worn by a user, a photographed image corresponding to the user is accumulated in the storage unit (described later) and the like so that an action of a user will be stored as an image. There may be associated information on a recorded time, information on a position where the photographed image is photographed, information on time when the photographed image is photographed, and the like, with the photographed image stored in the storage unit (described later) and the like, by meta data and the like.

In addition, it is possible to acquire history information (data) on an action history of a user by analyzing accumulated photographed images.

Thus, comparing an action of a user shown by the history information acquired by analysis and an action of the user shown by a photographed image that is newly acquired, it is possible to present a fact that the user has a missing article to the user.

Figure 3:
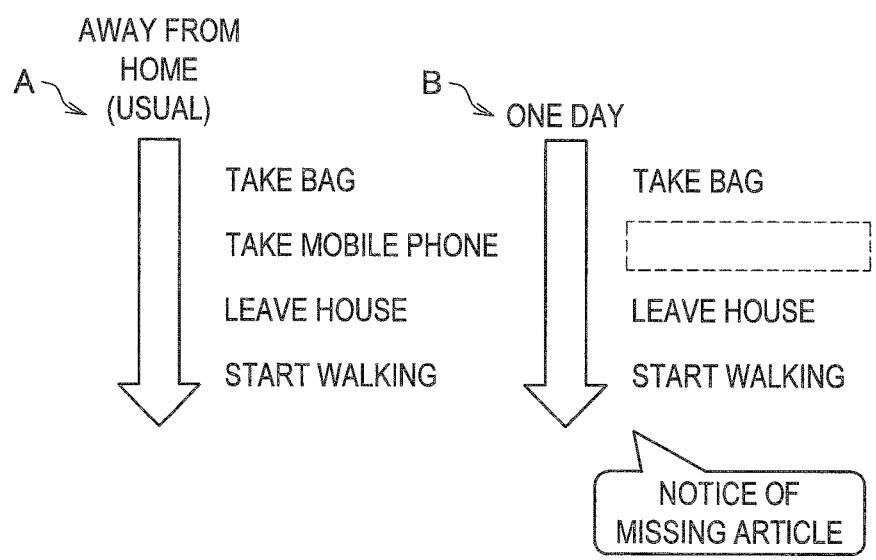
FIG. 3 is an illustration for describing a second example of the processing according to the method of controlling presentation, in accordance with the present embodiment.

FIG. 3 is an illustration for describing the second example of the processing according to the method of controlling presentation, in accordance with the present embodiment. An illustration A in FIG. 3 shows an example of an action of a user that history information shows, and the illustration B in FIG. 3 shows an example of that a newly acquired photographed image shows.

For example, comparing the action of the user shown in the illustration A in FIG. 3 and the action of the user shown in the illustration B in FIG. 3, the action of the user of "taking a mobile phone" is not acquired from the newly acquired photographed image. The action of the user that history information shows, and the action of the user that the newly acquired photographed image shows, are compared to obtain a difference, so that the presentation control device in accordance with the present embodiment detects that the action of the user of "taking a mobile phone" is not performed like the example shown in FIG. 3, for example. As a result, it is possible to present the fact that there is a missing article of the mobile phone to the user.

Hereinafter, there will be a more specifically described example of the determination processing and the presentation control processing, in accordance with the second example.

(2-2-1) An Example of Determination Processing in Accordance with the Second Example.

The presentation control device in accordance with the present embodiment performs determination processing by setting a condition related to an action history of a user and a condition related to a state of a target user to whom a content of the presentation is to be transmitted, for example, as a condition corresponding to the recognition target in accordance with the present embodiment.

More specifically, first, the presentation control device in accordance with the present embodiment detects a missing article, or a lack of an article that a user possesses on the basis of history information and a photographed image, as described by reference to FIG. 3, for example. The presentation control device in accordance with the present embodiment then determines that the condition related to an action history of the user is satisfied, in a case where a lack of an article that a user possesses is detected. That is, the condition related to the action history of the user in the determination processing in accordance with the second example includes a condition related to a lack of an article that the user possesses, or a condition in which there is a lack of an article that the user possesses, for example.

The presentation control device in accordance with the present embodiment determines whether a condition related to a state of the user is satisfied, if it is determined that the condition related to a lack of an article that the user possesses (an example of the condition related to an action history of the user) is satisfied. The condition related to a state of the user in the determination processing in accordance with the second example includes a condition related to whether the user takes a predetermined action, for example, or a condition in which the user takes the predetermined action.

The presentation control device in accordance with the present embodiment then determines that the condition corresponding to the recognition target is satisfied, in a case where it is determined that the condition related to a state of the user is satisfied.

More specifically, the presentation control device in accordance with the present embodiment estimates an action of a user on the basis of any one or more of a photographed image, motion information showing a motion of a user, and positional information showing a position of a user, for example. For example, the presentation control device in accordance with the present embodiment analyzes an object included in the photographed image to estimate that the user is in a vehicle such as a train and a bus, namely during a ride in a train and the like. In addition, the presentation control device in accordance with the present embodiment estimates whether the user is exercising, extent of exercise, change in user posture (such as change between a standing state and a seating state) of a user, and the like, for example, on the basis of a motion shown by motion information. Further, the presentation control device in accordance with the present embodiment estimates that the user drives an automobile, a bicycle, or the like, on the basis of a motion shown by the motion information and change of position shown by the positional information, for example. Processing according to estimation of an action of a user in accordance with the present embodiment user is not limited to the example described above, so that any technique capable of estimating an action of a user is available for the presentation control device in accordance with the present embodiment.

The presentation control device in accordance with the present embodiment determines that the condition related to a state of the user is satisfied in a case where an estimated action of the user is a predetermined action in accordance with the condition related to a state of the user.

Here, a motion of the user is detected by any motion detecting sensor capable of directly detecting a motion, such as an acceleration sensor and a gyro sensor, and any motion detecting sensor capable of indirectly detecting a motion, such as a biosensor for detecting a value related to a living body, such as a heart rate, a blood pressure, and a brain wave, for example. Hereinafter, a motion detecting sensor capable of directly detecting a motion and a motion detecting sensor capable of indirectly detecting a motion are collectively called a "motion detecting sensor".

The presentation control device in accordance with the present embodiment acquires motion information showing a detected motion from a motion detecting sensor to specify a motion of the user. The motion detecting sensor in accordance with the present embodiment is provided in a user device, for example. In a case where the presentation control device in accordance with the present embodiment is the user device above, for example, the presentation control device in accordance with the present embodiment includes the motion detecting sensor in accordance with the present embodiment.

In addition, the presentation control device in accordance with the present embodiment acquires positional information showing a detected position from the position detecting device to specify a position of the user, as described above.

FIG. 4 is an illustration for describing the second example of the processing according to the method of controlling presentation in accordance with the present embodiment, and shows an example of a table that the presentation control device in accordance with the present embodiment uses in the processing according to the method of controlling presentation in accordance with the second example. A column A in FIG. 4 shows an example of a predetermined action in accordance with a condition related to a state of a user, or an example of a condition related to whether the user takes a predetermined action. In addition, a column B in FIG. 4 shows an example of presentation timing or a trigger at which presentation is performed in the presentation control processing in accordance with the second example, and a column C in FIG. 4 shows an example of a presentation method and a presentation content that is presented in the presentation control processing in accordance with the second example.

In the presentation control device in accordance with the present embodiment determines, in a case where it is determined that an estimated action of a user, corresponds to any one of actions shown in the column A in FIG. 4, the estimated action of the user is determined as the predetermined action in accordance with the condition related to a state of the user.

The presentation control device in accordance with the present embodiment determines whether the condition related to a state of the user is satisfied by using an estimation result of the action of the user and a table such as shown in FIG. 4, if it is determined that the condition related to a lack of an article that the user possesses (an example of the condition related to an action history of the user) is satisfied.

(2-2-2) An Example of Presentation Control Processing in Accordance with the Second Example.

In a case where it is determined that the condition corresponding to the recognition target is satisfied, the presentation control device in accordance with the present embodiment allows presentation corresponding to the condition corresponding to the recognition target that is determined to be satisfied to be performed. For example, the presentation control device in accordance with the present embodiment refers to a table such as shown in FIG. 4 to specify presentation timing or a trigger (in the column B shown in FIG. 4), and a presentation method and presentation content (in the column C shown in FIG. 4), corresponding to the predetermined action corresponding to the estimated action of the user. The presentation control device in accordance with the present embodiment then allows presentation to be performed for the user by using the specified presentation timing or trigger, and presentation method and presentation content.

FIG. 5 is an illustration for describing the second example of the processing according to the method of controlling presentation in accordance with the present embodiment, and shows an example of a case where a presentation content is visually presented. FIG. 5 shows a case where the presentation content is displayed in a screen of an eyeglasses type HMD (an example of a presentation device).

In a case where presentation is performed by a presentation method and a presentation content shown in a section C1 in FIG. 4, for example, the presentation control device in accordance with the present embodiment first allows an alert icon to be displayed in a corner of a screen as shown in an illustration A in FIG. 5, for example. The presentation control device in accordance with the present embodiment then allows a missing article (a lack of an article that a user possesses) to be displayed with alert display of a dial box type such as shown in an illustration B in FIG. 5, in a case where it is determined that a user exists in a safe viewing circumstance on the basis of a photographed image, motion information, positional information, and the like, for example.

In addition, in a case where presentation is performed by a presentation method and a presentation content shown in a section C2 in FIG. 4, for example, the presentation control device in accordance with the present embodiment allows a missing article (a lack of an article that a user possesses) to be presented with the alert display of a dial box type such as shown in the illustration B in FIG. 5, for example.

Further, in a case where presentation is performed by a presentation method and a presentation content shown in a section C3 in FIG. 4, for example, the presentation control device in accordance with the present embodiment first does not allow an alert icon and the like to be displayed in a corner of a screen, for example. The presentation control device in accordance with the present embodiment allows an alert icon to be displayed in a corner of a screen as shown in the illustration A in FIG. 5, in a case where it is determined that extent of user exercise is reduced, on the basis of the photographed image, the motion information, and the like, for example. The presentation control device in accordance with the present embodiment then allows a missing article (a lack of an article that a user possesses) to be presented by changing the alert icon to an icon and a character that show the missing article (a lack of an article that a user possesses) as shown in the illustration B in FIG. 5, when a predetermined time elapses, for example.

In a case where presentation is performed by a presentation method and a presentation content shown in a section C4 in FIG. 4, for example, the presentation control device in accordance with the present embodiment first allows an alert icon to be displayed in a corner of a screen as shown in the illustration A in FIG. 5, for example. The presentation control device in accordance with the present embodiment then allows a missing article (a lack of an article that a user possesses) to be presented by changing the alert icon to an icon and a character that show the missing article (a lack of an article that a user possesses) as shown in the illustration B in FIG. 5, when a predetermined time elapses, for example.

The presentation control device in accordance with the present embodiment allows presentation to be performed for the user by using specified presentation timing or trigger, and presentation method and presentation content, as shown in FIG. 5, for example. It is needless to say that an example of presentation realized in the processing according to the method of controlling presentation in accordance with the second example is not limited to the examples shown in FIGS. 4 and 5.

(2-3) Third Example of the Processing According to the Method of Controlling Presentation in Accordance with the Present Embodiment: An Example of Realizing Presentation of a Lack of a Habitual Action.

Next, processing of realizing presentation of a lack of a habitual action will be described as the third example of the processing according to the method of controlling presentation in accordance with the present embodiment.

As shown in the processing in accordance with the second example described above, in a case where a photographed image stored in the storage unit (described later) is photographed with an imaging device worn by a user, a photographed image corresponding to the user is accumulated in the storage unit (described later) and the like so that an action of the user will be stored as an image. In addition, it is possible to acquire history information by analyzing accumulated photographed images.

Thus, comparing an action of a user shown by the history information acquired by analysis and an action of the user shown by a photographed image that is newly acquired, it is possible to present a fact that the user has a lack of a habitual action to the user.

Figure 6:
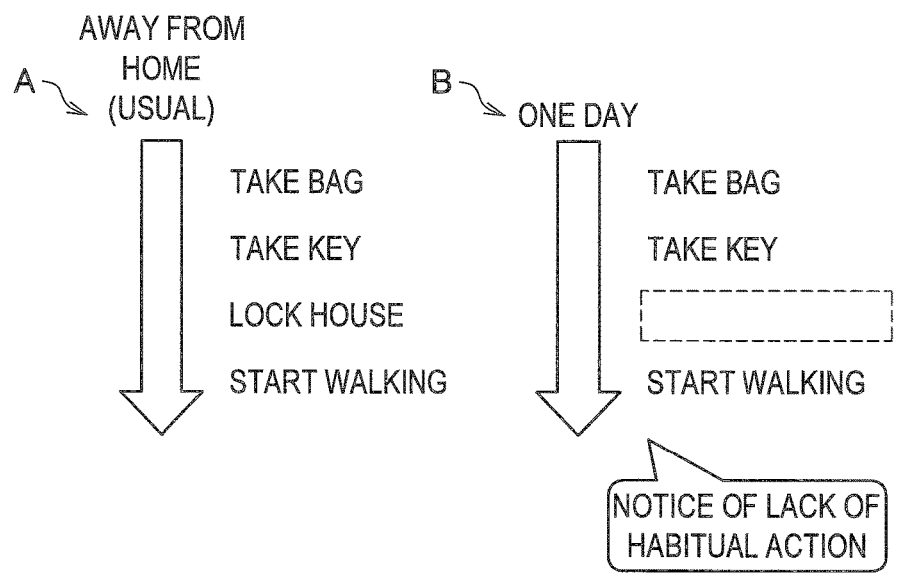
FIG. 6 is an illustration for describing a third example of the processing according to the method of controlling presentation, in accordance with the present embodiment.

FIG. 6 is an illustration for describing the third example of the processing according to the method of controlling presentation, in accordance with the present embodiment. An illustration A in FIG. 6 shows an example of an action of a user that history information shows, and an illustration B in FIG. 6 shows an example of an action of the user that a newly acquired photographed image shows.

For example, comparing an action of a user shown in the illustration A in FIG. 6 and the action of the user shown in the illustration B in FIG. 6, the action of the user of "locking the house" is not acquired from the newly acquired photographed image. The action of the user that history information shows, and the action of the user that the newly acquired photographed image shows, are compared to obtain a difference, so that the presentation control device in accordance with the present embodiment detects that the action of the user of "locking the house" is not performed like the example shown in FIG. 6, for example. As a result, it is possible to present the fact that there is a lack of the habitual action to the user.

Hereinafter, there will be a more specifically described example of the determination processing and the presentation control processing, in accordance with the third example.

(2-3-1) An Example of Determination Processing in Accordance with the Third Example.

As with the processing in accordance with the second example, the presentation control device in accordance with the present embodiment performs determination processing by setting a condition related to an action history of a user and a condition related to a state of a target user to whom a content of the presentation is to be transmitted, for example, as a condition corresponding to the recognition target in accordance with the present embodiment.

More specifically, first, the presentation control device in accordance with the present embodiment detects a lack of an action of a user on the basis of history information and a photographed image, as described by reference to FIG. 6, for example. The presentation control device in accordance with the present embodiment then determines that the condition related to an action history of the user is satisfied, in a case where a lack of an action of the user is detected. That is, the condition related to the action history of the user in the determination processing in accordance with the third example includes a condition related to a lack of an action of the user, or a condition in which there is a lack of an action of the user, for example.

The presentation control device in accordance with the present embodiment determines whether a condition related to a state of the user is satisfied, in a case where it is determined that the condition related to a lack of an action of the user (an example of the condition related to an action history of the user) is satisfied. As with the processing in accordance with the second example described above, the condition related to a state of the user in the determination processing in accordance with the third example includes a condition related to whether the user takes a predetermined action, for example, or a condition in which the user takes the predetermined action. That is, the presentation control device in accordance with the present embodiment that performs the determination processing in accordance with the third example can determine whether the condition related to a state of the user is satisfied, for example, as with a case where the determination processing in accordance with the second example described above is performed.

The presentation control device in accordance with the present embodiment then determines that the condition corresponding to the recognition target is satisfied, in a case where it is determined that the condition related to a state of the user is satisfied.

(2-3-2) An Example of Presentation Control Processing in Accordance with the Third Example.

If it is determined that the condition corresponding to the recognition target is satisfied, the presentation control device in accordance with the present embodiment allows presentation determined to satisfy the condition corresponding to the recognition target, to be performed. For example, as with the presentation control processing in accordance with the second example described above, the presentation control device in accordance with the present embodiment refers to a table such as shown in FIG. 4 to specify presentation timing or a trigger, and a presentation method and presentation content, corresponding to the predetermined action corresponding to the estimated action of the user. The presentation control device in accordance with the present embodiment then allows presentation to be performed for the user by using the specified presentation timing or trigger, and presentation method and presentation content.

(2-4) Fourth Example of the Processing According to the Method of Controlling Presentation in Accordance with the Present Embodiment: An Example of Realizing Presentation of Information on an Object.

Next, processing of realizing presentation of information on an object will be described as the fourth example of the processing according to the method of controlling presentation in accordance with the present embodiment.

For example, each of photographed images stored in the storage unit (described later) is analyzed by using an object recognition technique to enable an analysis result to be recorded for each of objects recognized from the photographed images as meta data. In a case where a predetermined object is detected from a newly acquired photographed image (an example of the condition corresponding to the recognition target), for example, the presentation control device in accordance with the present embodiment allows a presentation content related to the detected predetermined object, such as the latest usage, and the number of usage, to be presented to a user.

Hereinafter, there will be a more specifically described example of the determination processing and the presentation control processing, in accordance with the fourth example.

(2-4-1) An Example of Determination Processing in Accordance with the Fourth Example.

The presentation control device in accordance with the present embodiment performs determination processing by setting a condition related to whether the photographed image includes a predetermined object and a condition related to a state of a target user to whom a content of the presentation is to be transmitted, for example, as a condition corresponding to the recognition target in accordance with the present embodiment.

More specifically, the presentation control device in accordance with the present embodiment analyzes a newly acquired photographed image to detect an object included in the photographed image, for example. In addition, the presentation control device in accordance with the present embodiment may determine what category of objects a detected object is classified as, for example. Hereinafter, an example of the determination processing in accordance with the fourth example will be described by using an example in which the presentation control device in accordance with the present embodiment determines what category of objects a detected object is classified as.

In addition, the presentation control device in accordance with the present embodiment analyzes the newly acquired photographed image to specify an action of a user, for example.

In a case where a predetermined object (or an object that belongs to a predetermined category, and the same hereinafter) is detected from the photographed image and an action of a user, corresponding to the predetermined object is detected from the photographed image, for example, the presentation control device in accordance with the present embodiment determines that the condition corresponding to the recognition target is satisfied. That is, the condition related to whether the photographed image in the determination processing in accordance with the fourth example includes the predetermined object, includes a condition where the predetermined object is detected from the photographed image, for example. In addition, the condition related to a state of the user in the determination processing in accordance with the fourth example includes a condition related to an action of the user, corresponding to the predetermined object, or a condition where the action of the user, corresponding to the predetermined object is detected from the photographed image, for example.

The condition corresponding to the recognition target in the determination processing in accordance with the fourth example is not limited to the example described above.

For example, the condition corresponding to the recognition target in the determination processing in accordance with the fourth example may further include a condition of a circumstance related to the predetermined object. The condition of a circumstance related to the predetermined object in accordance with the present embodiment includes a condition related to a position of a user, a condition related to whether there is an object of the same type as the object detected from the photographed image at a predetermined place, a condition related to time, and the like, for example. In addition, the condition of a circumstance related to the predetermined object in accordance with the present embodiment may be a condition of a combination of two or more of the various conditions described above, for example. Further, a specific example of the condition of a circumstance related to the predetermined object in accordance with the present embodiment will be described later.

In a case where the condition corresponding to the recognition target further includes the condition of a circumstance related to the predetermined object, the presentation control device in accordance with the present embodiment determines that the condition corresponding to the recognition target is satisfied in a case where the condition of a circumstance related to the predetermined object is further satisfied, for example.

FIG. 7 is an illustration for describing the fourth example of the processing according to the method of controlling presentation in accordance with the present embodiment, and shows an example of a table that the presentation control device in accordance with the present embodiment uses in the processing according to the method of controlling presentation in accordance with the fourth example. A column A shown in FIG. 7 shows an example of the condition related to whether a photographed image includes a predetermined object, or an example of a category of objects. In addition, a column B shown in FIG. 7 shows an example of a condition related to a state of a user, or an example of an action of the user, corresponding to the predetermined object. Further, a column C shown in FIG. 7 shows an example of the condition of a circumstance related to the predetermined object, and a column D shown in FIG. 7 shows an example of a presentation content to be presented in the presentation control processing in accordance with the fourth example.

The column C in FIG. 7 shows "stay home", "away from home", and "at home" that correspond to an example of the condition related to a position of the user, and shows "the same food item is at home" that corresponds to an example of a condition related to whether there is an object of the same type as an object detected from the photographed image at a predetermined place, and also shows "current time" that corresponds to an example of a condition related to time.

The presentation control device in accordance with the present embodiment determines that the predetermined object is detected form the photographed image, in a case where a category of the object detected from the photographed image corresponds to any one of categories shown in the column A in FIG. 7, for example.

In addition, the presentation control device in accordance with the present embodiment determines that an action of a user, corresponding to the predetermined object is detected from the photographed image, in a case where an action of the user acquired by analyzing a photographed image corresponds to an action corresponding to a detected predetermined object, such as shown in the column B in FIG. 7, for example.

In addition, in a case where the condition of a circumstance related to the predetermined object is further determined as the condition corresponding to the recognition target, the presentation control device in accordance with the present embodiment determines whether a condition of a circumstance, corresponding to the detected predetermined object, is satisfied or not. The presentation control device in accordance with the present embodiment determines whether the condition of a circumstance is satisfied, on the basis of positional information showing a position of a user, photographed image stored in the storage unit (described later), time information showing time to be acquired from a clock and so on, and the like, for example.

An action of a user, corresponding to the predetermined object, serving as a condition related to a state of the user in accordance with the fourth example, is not limited to the examples shown in the column B in FIG. 7.

FIG. 8 is an illustration for describing the fourth example of the processing according to the method of controlling presentation in accordance with the present embodiment, and shows another example of a table that the presentation control device in accordance with the present embodiment uses in the processing according to the method of controlling presentation in accordance with the fourth example. As with the A column shown in FIG. 7, a column A shown in FIG. 8 shows an example of the condition related to whether a photographed image includes a predetermined object, and a specific example of a category of objects is omitted to be shown in FIG. 8. In addition, a column B shown in FIG. 8 shows an example of the condition related to a state of a user, or another example of an action of the user, corresponding to the predetermined object. Further a column C shown in FIG. 8 shows an example of a presentation content to be presented in the presentation control processing in accordance with the fourth example.

In a case where a table such as shown in FIG. 8 is used, for example, the presentation control device in accordance with the present embodiment determines that an action of a user corresponding to the predetermined object is detected form the photographed image, in a case where an action of the user, acquired by analyzing a photographed image corresponds to a predetermined gesture (an example of an action corresponding to the predetermined object) such as shown in the column B in FIG. 8, for example.

For example, as shown in the B column in FIG. 8, in a case where the presentation control device in accordance with the present embodiment detects the predetermined gesture to determine that an action of a user, corresponding to the predetermined object is detected form the photographed image, it is possible that the user allows the presentation control device in accordance with the present embodiment to more explicitly perform processing according to the method of controlling presentation in accordance with the present embodiment. That is, the user can more explicitly receive presentation of information on an object. In addition, since it is possible to allow the presentation control device in accordance with the present embodiment to more explicitly perform the processing according to the method of controlling presentation in accordance with the present embodiment, the user can more quickly receive the presentation of the information on the object.

In addition, as shown in FIG. 8, it is possible that the presentation control device in accordance with the present embodiment does not determine a condition of a circumstance related to the predetermined object, such as shown in the column C in FIG. 7 as one of conditions corresponding to the recognition target.

(2-4-2) An Example of Presentation Control Processing in Accordance with the Fourth Example.

In a case where it is determined that the condition corresponding to the recognition target is satisfied, the presentation control device in accordance with the present embodiment allows presentation determined to satisfy the condition corresponding to the recognition target to be performed. For example, the presentation control device in accordance with the present embodiment refers to a table such as shown in FIGS. 7 and 8 to specify a presentation content (the D column shown in FIG. 7 and the D column shown in FIG. 8) corresponding to a detected predetermined object. The presentation control device in accordance with the present embodiment then allows the specified presentation content to be presented to a user.

Figure 9:
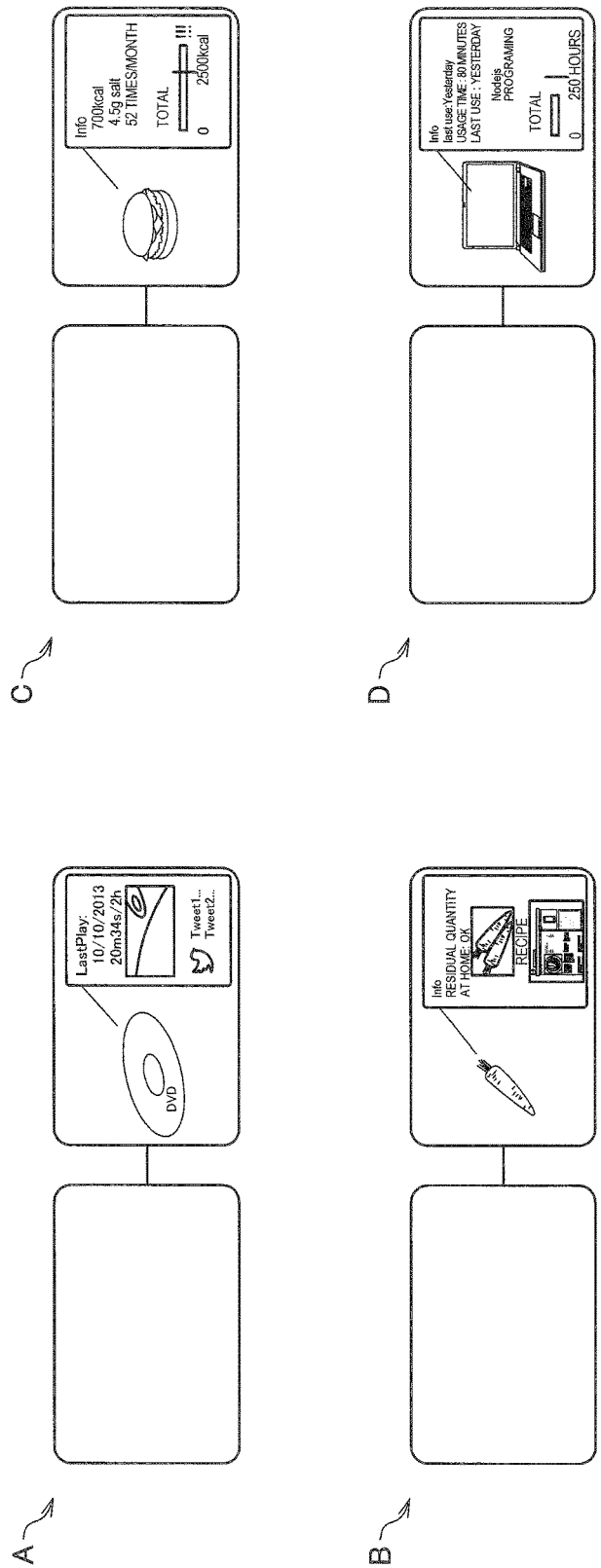
FIG. 9 is an illustration for describing a fourth example of the processing according to the method of controlling presentation, in accordance with the present embodiment.
Figure 10:
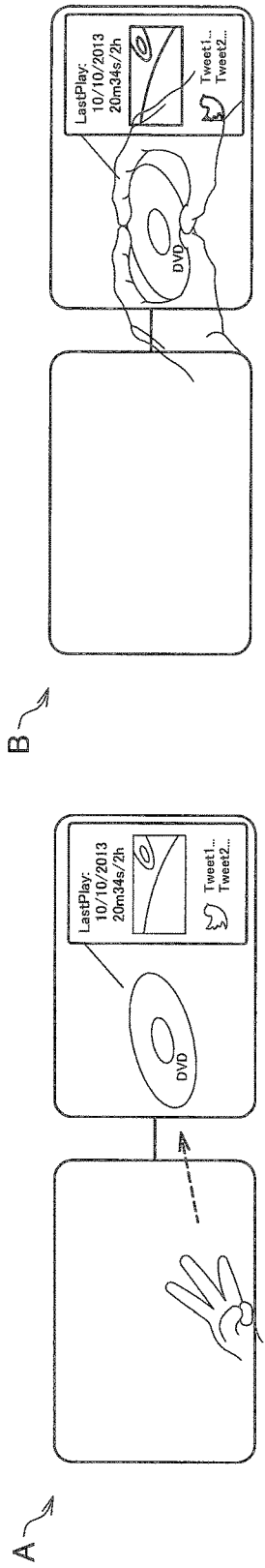
FIG. 10 is an illustration for describing a fourth example of the processing according to the method of controlling presentation, in accordance with the present embodiment.

Each of FIGS. 9 and 10 is an illustration for describing the fourth example of the processing according to the method of controlling presentation in accordance with the present embodiment, and shows an example of a case where presentation content is visually presented. Each of FIGS. 9 and 10 shows a case where a presentation content is displayed in a screen of an eyeglasses type HMD (an example of a presentation device). FIG. 9 shows an example of presentation in a case where the presentation control device in accordance with the present embodiment specifies a presentation content corresponding to the detected predetermined object, by reference to the table shown in FIG. 7. In addition, FIG. 10 shows an example of presentation in a case where the presentation control device in accordance with the present embodiment specifies a presentation content corresponding to the detected predetermined object, by reference to the table shown in FIG. 8.

For example, in a case where a presentation content shown in a section D1 in FIG. 7 is presented, the presentation control device in accordance with the present embodiment allows the presentation content shown in the section D1 in FIG. 7 to be presented for an object corresponding to a detected predetermined object in multimedia as information on the object, as shown in an illustration A in FIG. 9, for example.

In addition, for example, in a case where a presentation content shown in a section D2 in FIG. 7 is presented, the presentation control device in accordance with the present embodiment allows the presentation content shown in the section D2 in FIG. 7 to be presented for an object corresponding to a detected predetermined object of a food item for cooking as information on the object, as shown in an illustration B in FIG. 9, for example.

Further, for example, in a case where a presentation content shown in a section D3 in FIG. 7 is presented, the presentation control device in accordance with the present embodiment allows the presentation content shown in the section D3 in FIG. 7 to be presented for an object corresponding to a detected predetermined object of a food item for non-cooking as information on the object, as shown in an illustration C in FIG. 9, for example.

Furthermore, for example, in a case where a presentation content shown in a section D4 in FIG. 7 is presented, the presentation control device in accordance with the present embodiment allows the presentation content shown in the section D4 in FIG. 7 to be presented for an object corresponding to a detected predetermined object of an object related to a PC as information on the object, as shown in an illustration D in FIG. 9, for example.

As shown in FIG. 8, in a case where an action of a user, corresponding to the predetermined object is detected from the photographed image by detecting a predetermined gesture, the presentation control device in accordance with the present embodiment allows a presentation content corresponding to the object to be presented as information on the object, in response to a predetermined gesture, such as a gesture of indicating an object with three fingers (an illustration A shown in FIG. 10), and a gesture of enclosing an object with both hands (an illustration B shown in FIG. 10), for example.

A visual presentation method of a presentation content in the processing according to the method of controlling presentation in accordance with the fourth example is not limited to examples shown in FIGS. 9 and 10.

Figure 11:
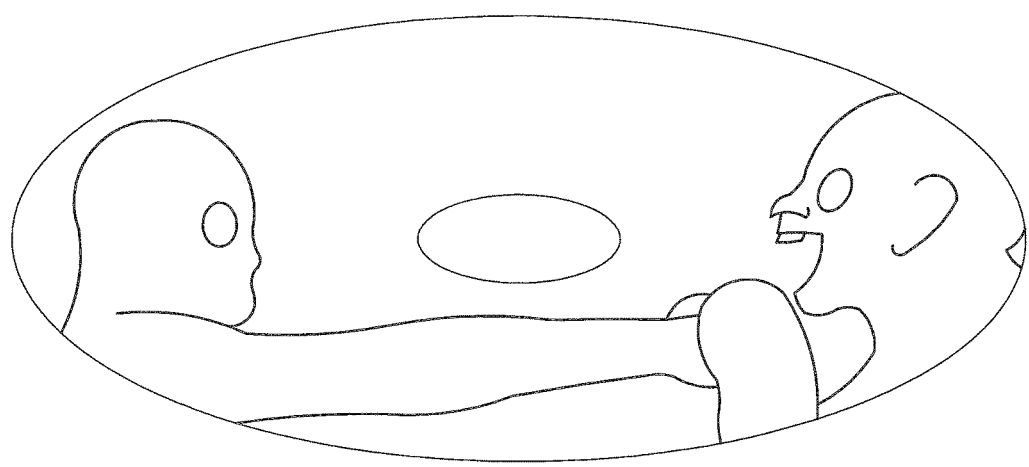
FIG. 11 is an illustration for describing a fourth example of the processing according to the method of controlling presentation, in accordance with the present embodiment.

FIG. 11 is an illustration for describing the fourth example of the processing according to the method of controlling presentation in accordance with the present embodiment, and shows another example of a case where presentation content is visually presented.

For example, as shown in FIG. 11, it is possible that the presentation control device in accordance with the present embodiment allows a presentation content corresponding to an object to be superimposed on the predetermined object detected from a photographed image so that the presentation content is presented for a user. The presentation control device in accordance with the present embodiment allows an image in which a predetermined object detected from a photographed image, and a presentation content corresponding to the object, are synthesized, for example, to be displayed in a screen of an HMD (an example a presentation device) to realize presentation such as shown in FIG. 11.

(2-5) A Fifth Example of Processing According to the Method of Controlling Presentation in Accordance with the Present Embodiment.

The processing according to the method of controlling presentation in accordance with the present embodiment is not limited to the processing in accordance with the first to fourth examples described above. For example, the presentation control device in accordance with the present embodiment is capable of performing presentation by using a three-dimensional space image composed based on a plurality of photographed images, as presentation control processing in accordance with the present embodiment.

(2-5-1) A First Example of the Presentation Control Processing in Accordance with the Fifth Example.

The presentation control device in accordance with the present embodiment composes a three-dimensional space image on the basis of a plurality of photographed images, for example, and composes a three-dimensional space image at regular intervals, at irregular intervals, or at the time when the number of photographed images stored in the storage unit (not shown) and the like increases by a predetermined number, for example, by using a plurality of photographed images stored in the storage unit (not shown) and the like. Here, the presentation control device in accordance with the present embodiment composes a three-dimensional space image by using any technique capable of composing a three-dimensional space image by using a plurality of images.

In addition, the presentation control device in accordance with the present embodiment allows presentation associated with the recognition target to be performed by using the composed three-dimensional space image.

Figure 12:
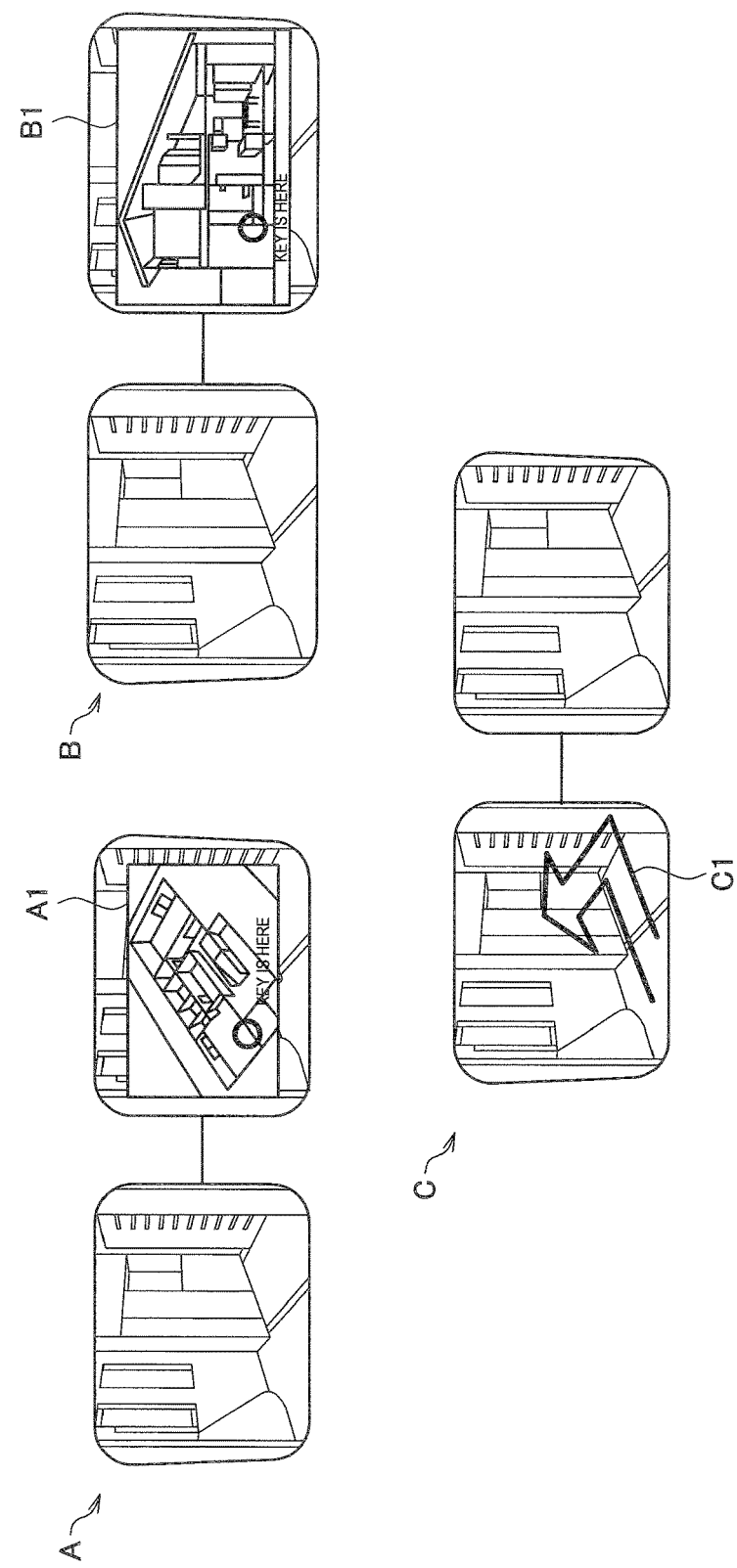
FIG. 12 is an illustration for describing a fifth example of the processing according to the method of controlling presentation, in accordance with the present embodiment.

FIG. 12 is an illustration for describing the fifth example of the processing according to the method of controlling presentation in accordance with the present embodiment, and shows an example of presentation associated with the recognition target, by using a composed three-dimensional space image. Here, each of illustrations A to C shown in FIG. 12 shows an example of a case where a search result is displayed in a screen of an eyeglasses type HMD (an example of a presentation device), in a case where a key is retrieved from a photographed image as a predetermined object as with FIG. 2, for example.

The presentation control device in accordance with the present embodiment specifies where the photographed image corresponds to in the three-dimensional space image by pattern matching using the photographed image including the retrieved key (an example of a predetermined object), and the like, for example, or where the retrieved key exists in the three-dimensional space image. In addition, the presentation control device in accordance with the present embodiment allows a position of the retrieved key to be displayed in the three dimensional space image, as shown in an illustration A1 of the illustration A in FIG. 12, and an illustration B1 of the illustration B in FIG. 12, for example, so that presentation associated with the recognition target is performed for a user.

Further, the presentation control device in accordance with the present embodiment may specify where the user exists in the three-dimensional space image by further using positional information showing a position of the user, for example, or a position of the user in the three dimensional space image. Further, in a case where the position of the user is specified in the three-dimensional space image, display for guiding the user to the key is performed, as shown in a section C1 of the illustration C in FIG. 12, for example, so that presentation associated with the recognition target is performed for the user. Here, the display as shown in a section C1 of the illustration C in FIG. 12 can be realized by using an augmented reality (AR) technique, for example.

For example, the presentation associated with the recognition target such as shown in FIG. 12 is performed to enable the user to be guided to a predetermined position such as a position where the retrieved predetermined object exists.

(2-5-2) A Second Example of the Presentation Control Processing in Accordance with the Fifth Example.

An example of presentation using a composed three-dimensional space image is not limited to the examples shown in FIG. 12. For example, the presentation control device in accordance with the present embodiment is capable of displaying also a virtual object in a three dimensional space image composed by processing as with the first example of the presentation control processing in accordance with the fifth example described above.

Figure 13:
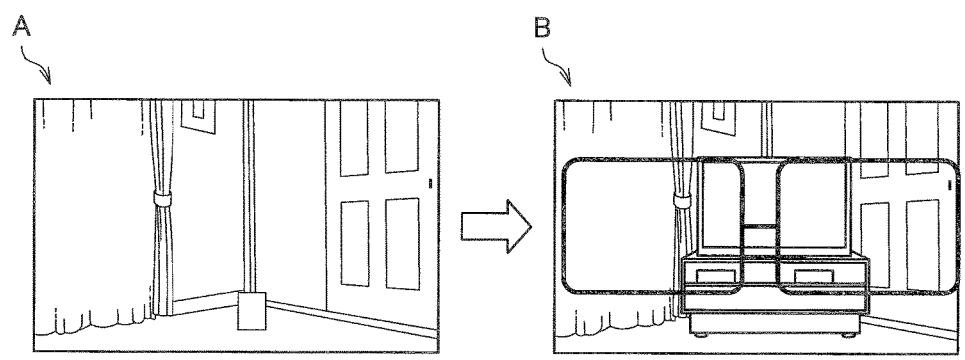
FIG. 13 is an illustration for describing a fifth example of the processing according to the method of controlling presentation, in accordance with the present embodiment.

FIG. 13 is an illustration for describing the fifth example of the processing according to the method of controlling presentation in accordance with the present embodiment, and shows an example of presentation using a composed three-dimensional space image. An illustration A shown in FIG. 13 shows an example of an actual space that is the basis of a three dimensional space shown in the composed three dimensional space image. In addition, an illustration B shown in FIG. 13 shows an example of a case where a virtual television receiver (an example of a virtual object) is displayed in the three dimensional space shown in the composed three dimensional space image.

The three dimensional space image is composed to enable the presentation control device in accordance with the present embodiment to specify a three dimensional space corresponding to an actual space such as shown in the illustration A shown in FIG. 13. As a result, the presentation control device in accordance with the present embodiment arranges a virtual object corresponding to an actual object in the three dimensional space to enable a simulation to be realized as if the actual object is arranged in the actual space, as shown in the illustration B shown in FIG. 13, for example.

Since the presentation control device in accordance with the present embodiment realizes a simulation as shown in the illustration B shown in FIG. 13 by using a composed three-dimensional space image, it is unnecessary to use an AR marker like an existing AR technique, and a user does not have to hold an information processor such as a smartphone. Thus, the presentation control device in accordance with the present embodiment is capable of providing a more convenient simulation of a layout of a virtual object to a user.

(2-6) A Sixth Example of Processing According to the Method of Controlling Presentation in Accordance with the Present Embodiment.

The presentation control device in accordance with the present embodiment is capable of performing processing formed by combining two or more of processing steps in accordance with the first to fifth examples described above, for example.

The presentation control device in accordance with the present embodiment performs the processing in accordance with the first to sixth examples described above, for example, as the processing according to the method of controlling presentation in accordance with the present embodiment. Here, the presentation control device in accordance with the present embodiment, for example, determines whether the condition corresponding to the recognition target to be recognized is satisfied on the basis of a photographed image. In a case where it is determined that the condition corresponding to the recognition target is satisfied, the presentation associated with the recognition target is performed.

Thus, the presentation control device in accordance with the present embodiment enables the presentation, corresponding to the recognition target to be recognized on the basis of the photographed image, to be performed for a user.

In addition, the presentation control device in accordance with the present embodiment processes a photographed image photographed with an imaging device in accordance with the present embodiment such as an imaging device worn by a user, for example. Here, even if an object included in the photographed image is not network-enabled, the presentation control device in accordance with the present embodiment is capable of using information on the object that is not network-enabled by processing the photographed image. Accordingly, the user can receive presentation by the method of controlling presentation in accordance with the present embodiment without allowing an apparatus that is not network-enabled (an example of an object) to be network-enabled, or without allowing all apparatuses to be network-enabled, for example.

Further, the presentation control device in accordance with the present embodiment is capable of presenting a presentation content corresponding to a user's context by using meta data acquired by applying various object recognition processing (such as processing for recognizing a kind of an object) to a photographed image.

Furthermore, the presentation control device in accordance with the present embodiment is capable of detecting an action of a user, different from a usual action by matching of an action of the user, using history information and a newly acquired photographed image as with the processing in accordance with the second example described above and the processing in accordance with the third example described above, for example, to present a fact that the action of the user, different from the usual action is taken. Thus, the presentation control device in accordance with the present embodiment is capable of preventing not only a missing article and a lack of a habitual action, but an accident caused by an action of a user, different from a usual action and the like.

(A Presentation Control Device in Accordance with the Present Embodiment)

Next, there will be described an example of a configuration of the presentation control device in accordance with the present embodiment, capable of performing the processing according to the method of controlling presentation in accordance with the present embodiment, described above.

Figure 14:
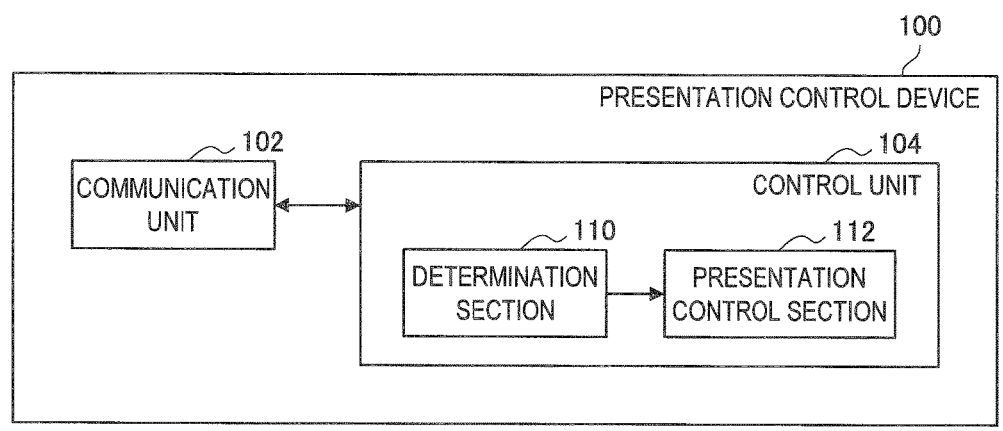
FIG. 14 is a block diagram showing an example of a configuration of a presentation control device in accordance with the present embodiment.

FIG. 14 is a block diagram showing an example of a configuration of a presentation control device 100 in accordance with the present embodiment. The presentation control device 100 includes a communication unit 102, and a control unit 104, for example.

In addition, the presentation control device 100 may include a read only memory (ROM, not shown), a random access memory (RAM, not shown), a storage unit (not shown), an operation unit (not shown) that a user can operate, a display (not shown) for displaying various pictures in a screen, an imaging unit (not shown) for photographing an image, and the like, for example. In a case where a display (not shown) is provided, the display (not shown) serves as a presentation section in which presentation is performed by a visual presentation method. The presentation control device 100 includes a bus serving as a transmission line of data, the bus connecting each of components described above, for example.

The ROM (not shown) stores control data such as a program and a calculation parameter, to be used by the control unit 104, and the RAM (not shown) temporarily stores a program to be executed by the control unit 104.

The storage unit (not shown) is a storage mechanism that is provided in the presentation control device 100, and that stores various data items, such as image data showing a photographed image, meta data corresponding to the photographed image, an application, and the like, for example. Here, the storage unit (not shown) includes a magnetism recording medium such as a hard disk, an electrically erasable and programmable read only memory (EEPROM), a nonvolatile memory such as a flash memory, and the like, for example. In addition, the storage unit (not shown) may be detachable from the presentation control device 100.

The operation unit (not shown) includes an operation input device that will be described later, for example, and the display (not shown) includes a display device that will be described later, for example. In addition, the imaging unit (not shown) includes an imaging device that will be described later, for example.

(An Example of a Hardware Configuration of the Presentation Control Device 100)

Figure 15:
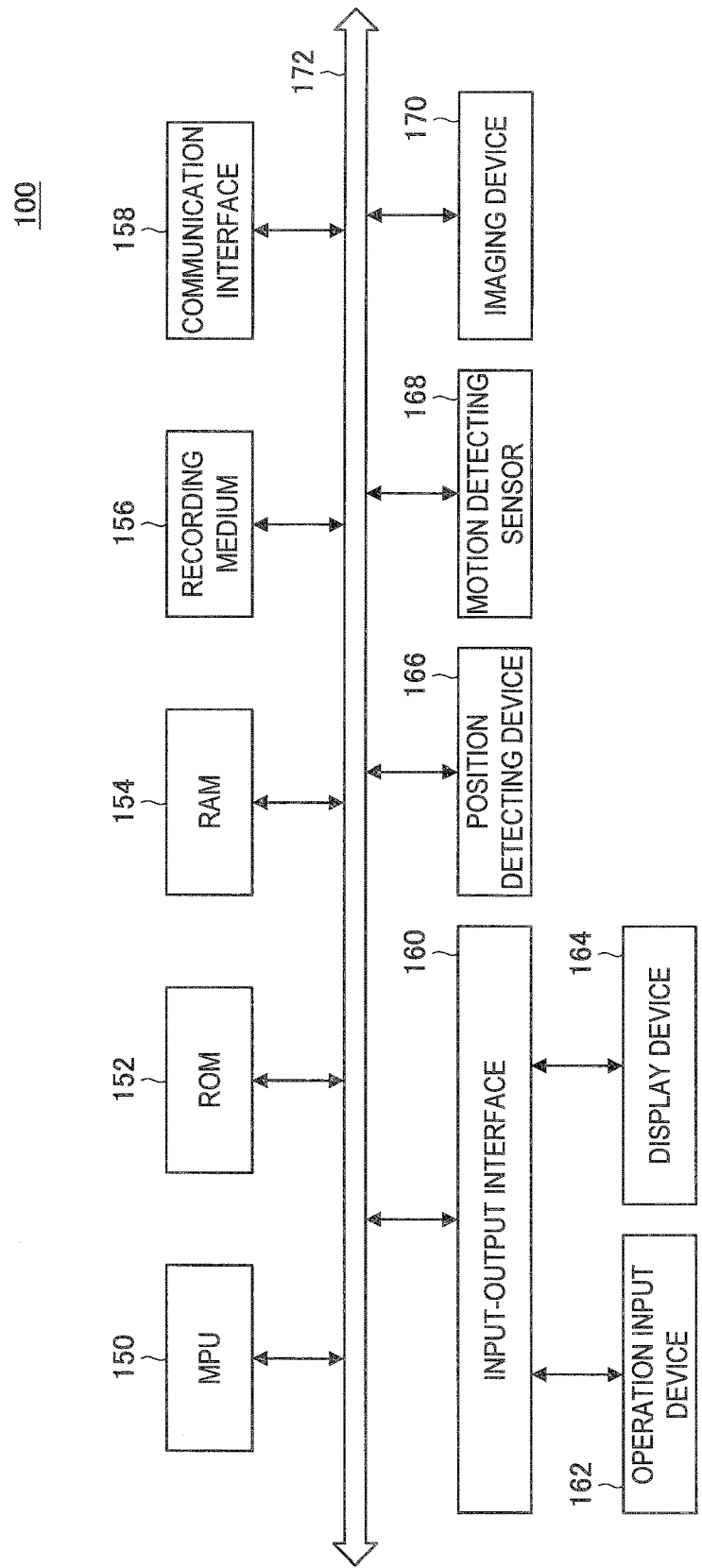
FIG. 15 is an illustration showing an example of a hardware configuration of the presentation control device in accordance with the present embodiment.

FIG. 15 is an illustration showing an example of a hardware configuration of the presentation control device 100 in accordance with the present embodiment. The presentation control device 100 includes an MPU 150, a ROM 152, a RAM 154, a recording medium 156, a communication interface 158, an input-output interface 160, an operation input device 162, a, display device 164, a position detecting device 166, a motion detecting sensor 168, and an imaging device 170, for example. In addition, the presentation control device 100 includes a bus 172 serving as a transmission line of data, the bus connecting each of components, for example.

The MPU 150 is composed of an MPU, various kinds of processing circuits, and the like, for example, and functions as the control unit 104 that controls the entire presentation control device 100. In addition, in the presentation control device 100, the MPU 150 serves as a determination section 110 and a presentation control section 112, to be described later, for example.

The ROM 152 stores control data such as a program and a calculation parameter, and the like, to be used by the MPU 150, and the RAM 154 temporarily stores a program to be executed by the MPU 150, for example.

The recording medium 156 functions as the storage unit (not shown), and stores various data items, such as image data showing a photographed image, meta data corresponding to the photographed image, an application, and the like, for example. Here, the recording medium 156 includes a magnetism recording medium such as a hard disk, and a nonvolatile memory such as a flash memory, for example. In addition, the recording medium 156 may be detachable from the presentation control device 100.

The communication interface 158 is a communication mechanism provided in the presentation control device 100, and functions as the communication unit 102 for performing wireless or wired communication with a wearable device worn by a user, a device possessed by a user (a communication device such as a mobile phone, for example), and an external device such as a server, through a network (or directly). Here, the communication interface 158 includes an communication antenna and an RF circuit (wireless communication), an IEEE802.15.1 port and a transmission-reception circuit (wireless communication), an IEEE802.11b port and a transmission-reception circuit (wireless communication), a local area network (LAN) terminal and a transmission-reception circuit (wired communication), and the like, for example. In addition, the network in accordance with the present embodiment includes a wired network such as a LAN and a wide area network (WAN), a wireless network such as a wireless local area network (WLAN) and a wireless wide area network (WWAN) through a base station, the Internet using a communication protocol such as transmission control protocol/internet protocol (TCP/IP), and the like, for example.

The input-output interface 160 is connected with the operation input device 162 and the display device 164, for example. Here, the input-output interface 160 includes a universal serial bus (USB) terminal, a digital visual interface (DVI) terminal, a high-definition multimedia interface (HDMI) terminal, various kinds of processing circuits, and the like, for example. It is needless to say that the input-output interface 160 can be connected with an operation input device (such a as a keyboard and a mouse) as an external device of the presentation control device 100, and an external device such as a display device.

The operation input device 162 serves as the operation unit (not shown), and is provided in the presentation control device 100 to be connected with the input-output interface 160 inside the presentation control device 100, for example. In addition, the operation input device 162 includes a button, a direction key, a rotary-type selector such as a jog dial, a combination of these components, and the like, for example.

The display device 164 serves as the display (not shown) to function as a presentation device capable of performing a visual presentation method, and is provided in the presentation control device 100 to be connected with the input-output interface 160 inside the presentation control device 100, for example. The display device 164 includes a liquid crystal display (LCD), an organic electro-luminescence (EL) display or so-called an organic light emitting diode (OLED) display, and the like, for example. In addition, the display device 164 may be a device such as a touch screen capable of display and user operation, for example.

The position detecting device 166 detects a position of the presentation control device 100 (or a position of a user possessing the presentation control device 100). The position detecting device 166 includes any position detecting device capable of specifying a position, such as a GPS device, and a device that estimates a position on the basis of a communication result with a base station and an access point, for example.

The motion detecting sensor 168 detects a motion of the presentation control device 100 or a motion of a user possessing the presentation control device 100. The motion detecting sensor 168 includes a sensor capable of directly detecting a motion, such as an acceleration sensor and a gyro sensor, and a sensor capable of indirectly detecting a motion, such as a biosensor for detecting a value related to a living body, such as a heart rate, a blood pressure, and a brain wave, for example.

The imaging device 170 functions as the imaging unit (not shown), and includes a lens/imaging element, and a signal processing circuit, for example. The lens/imaging element is composed of a lens of an optical system, and an imaging sensor such as a CMOS using a plurality of imaging elements, for example. In addition, the signal processing circuit includes an automatic gain control (AGC) circuit, and an analog-to-digital converter (ADC), for example, and converts an analog signal created by the imaging element into a digital signal (image data) to perform various signal processing. The signal processing performed by the signal processing circuit includes white balance correction processing, color tone correction processing, gamma correction processing, YCbCr conversion processing, edge emphasis processing, and the like, for example.

The presentation control device 100 with a configuration shown in FIG. 15, for example, performs the processing according to the method of controlling presentation in accordance with the present embodiment. The presentation control device 100 in accordance with the present embodiment is not limited to the hardware configuration shown in FIG. 15.

For example, the presentation control device 100 may include a plurality of communication interfaces with a different communication method or with the same communication method.

In addition, in a case where communication with an external device is performed through an external communication device connected through the input-output interface 160, and in a configuration in which stand-alone processing is performed, for example, the presentation control device 100 may not include the communication interface 158.

In addition, the presentation control device 100 may apply a configuration without the operation input device 162 and the display device 164.

Further, in a case where the presentation control device 100 does not use a position and a motion of the presentation control device 100, for example, a configuration without the position detecting device 166 and the motion detecting sensor 168 is applicable.

Furthermore, in a case where the presentation control device 100 is configured to process a photographed image photographed with an external device, for example, a configuration without the imaging device 170 is applicable.

In addition, the presentation control device 100 may further include a voice output device (not shown) that outputs a voice, and a vibrator (not shown) that produces vibration, for example. Here, the voice output device (not shown) includes an amplifier for amplifying a voice signal, a speaker, and the like, for example. The voice output device (not shown) functions as a presentation device capable of performing an auditory presentation method, and the vibrator (not shown) functions as a presentation device capable of performing a tactile presentation method. That is, in a case where the presentation control device 100 is provided with the voice output device (not shown), the voice output device (not shown) provided serves as the presentation section that performs presentation by the auditory presentation method. In addition, in a case where the presentation control device 100 is provided with the vibrator (not shown), the vibrator (not shown) provided serves as the presentation section that performs presentation by the tactile presentation method.

There will be described an example of the configuration of the presentation control device 100 by reference to FIG. 14 again. The communication unit 102 is a communication mechanism provided in the presentation control device 100, and performs wireless or wired communication with an external device such as a user device and a server through a network (or directly). In addition, communication with the communication unit 102 is controlled by the control unit 104, for example.

For example, in a case where the communication unit 102 receives an image signal (a digital signal or an analog signal) showing a photographed image transmitted from the external device, the control unit 104 (more specifically, the determination section 110 described later) performs the processing according to the method of controlling presentation in accordance with the present embodiment by using the photographed image shown by the image signal received by the communication unit 102 from the external device. Here, the photographed image shown by the image signal received by the communication unit 102 from the external device, to be processed by the control unit 104 (more specifically, the determination section 110 described later), includes an image stored in the storage unit (described later), for example. The control unit 104 is also capable of processing an image signal transmitted from the communication unit 102 that is received from the external device, for example.

In addition, in a case where a control signal for controlling presentation and data (such as image data, voice data, and vibration pattern data) showing a presentation content are transmitted from the control unit 104 (more specifically, the presentation control section 112 described later), for example, the communication unit 102 transmits the transmitted data to the external device. Since the communication unit 102 transmits the data above transmitted from the control unit 104 to the external device, the presentation control device 100 can allow the external device to perform presentation associated with the recognition target.

Here, the communication unit 102 includes a communication antenna and an RF circuit, a LAN terminal and a transmission and reception circuit, and the like, for example, however, a configuration of the communication unit 102 is not limited to the above. For example, the communication unit 102 may have a configuration capable of performing communication that supports any standard, such as a USB terminal and a transmission and reception circuit, and any configuration capable of communicating with an external device through a network.

The control unit 104 is composed of an MPU and the like, for example, and serves as a unit for controlling the entire presentation control device 100. In addition, the control unit 104 includes the determination section 110, and the presentation control section 112, for example, and serves as a unit for performing the processing according to the method of controlling presentation in accordance with the present embodiment in an initiative manner.

The determination section 110 serves as a section for performing the determination processing in accordance with the present embodiment in an initiative manner, and determines whether a condition corresponding to a recognition target to be recognized on the basis of a photographed image is satisfied. More specifically, the determination section 110 performs any one of determination processing in the determination processing according to the methods of controlling presentation in accordance with the first to fourth, and the sixth examples above.

The presentation control section 112 serves as a section for performing the determination processing in accordance with the present embodiment in an initiative manner, and allows presentation associated with the recognition target to be performed in a case where the determination section 110 determines that the condition corresponding to the recognition target is satisfied.

The presentation control section 112 transmits a control signal of controlling presentation and data (such as image data, voice data, vibration pattern data) showing presentation content to a presentation device to allow the presentation device to perform presentation associated with the recognition target, for example.

Here, the presentation device allowed to perform presentation by the presentation control section 112, includes a presentation device constituting a presentation unit, a presentation device connected to the presentation control device 100, a presentation device provided in an external device, a presentation device connected to the external device, and the like, for example. In addition, the presentation device allowed to perform presentation by the presentation control section 112, includes a presentation device that is worn by a user, and a presentation device that is not worn by a user, for example. The presentation device that is worn by a user, includes a display device of an HMD, an earphone, a vibrator provided in a wearable device, and the like, for example. In addition, the presentation device that is not worn by a user, includes, a display device provided in a device possessed by a user, and so on, such as a mobile phone, a speaker provided in a device possessed by a user, and so on, a vibrator provided in a device possessed by a user, and so on, and the like, for example.

More specifically, the presentation control section 112 performs any one of determination processing in the processing according to the methods of controlling presentation in accordance with the first to sixth examples above, for example.

The control unit 104 includes the determination section 110 and the presentation control section 112 to perform the processing according to the method of controlling presentation in accordance with the present embodiment in an initiative manner, for example.

The presentation control device 100 with the configuration shown in FIG. 14, for example, performs the processing according to the method of controlling presentation in accordance with the present embodiment (such as the determination processing and the presentation control processing, described above).

Thus, the presentation control device 100 with the configuration shown in FIG. 14, for example, enables presentation, corresponding to a recognition target to be recognized on the basis of a photographed image, to be performed for a user. In addition, the presentation control device 100 with the configuration shown in FIG. 14, for example, can achieve an effect to be achieved by performing the processing above according to the method of controlling presentation in accordance with the present embodiment (such as processing according to the methods of controlling presentation in accordance with the first to sixth examples).

The presentation control device in accordance with the present embodiment is not limited to the configuration shown in FIG. 14. For example, the presentation control device in accordance with the present embodiment may individually include one or both of the determination section 110 and the presentation control section 112, shown in FIG. 14 (for example, one or both of the determination section 110 and the presentation control section 112 are configured in a processing circuit separated from the control unit 104).

In addition, the presentation control device in accordance with the present embodiment may not include the communication unit 102, in a configuration in which stand-alone processing is performed, and in a case where communication with an external device through a connected external communication device is performed, for example. In a configuration in which stand-alone processing is performed, the presentation control device in accordance with the present embodiment processes a photographed image photographed with an imaging unit (not shown) or an imaging device connected to the imaging unit, and a photographed image stored in the storage unit (not shown), for example.

Further, the presentation control device in accordance with the present embodiment may further include one or two or more of a storage unit (not shown), a presentation section (not shown) composed of a presentation device, and an imaging unit (not shown) composed of an imaging device, for example.

(A Presentation Control System in Accordance with the Present Embodiment)

As described above, the presentation control device in accordance with the present embodiment transmits a control signal for controlling presentation and data (such as image data, voice data, vibration pattern data) showing a presentation content, for example, to an external device to enable a presentation device provided in the external device and a presentation device connected to the external device to perform presentation. Next, there will be described an example of the presentation control system in accordance with the present embodiment, including the presentation control device in accordance with the present embodiment.

Figure 16:
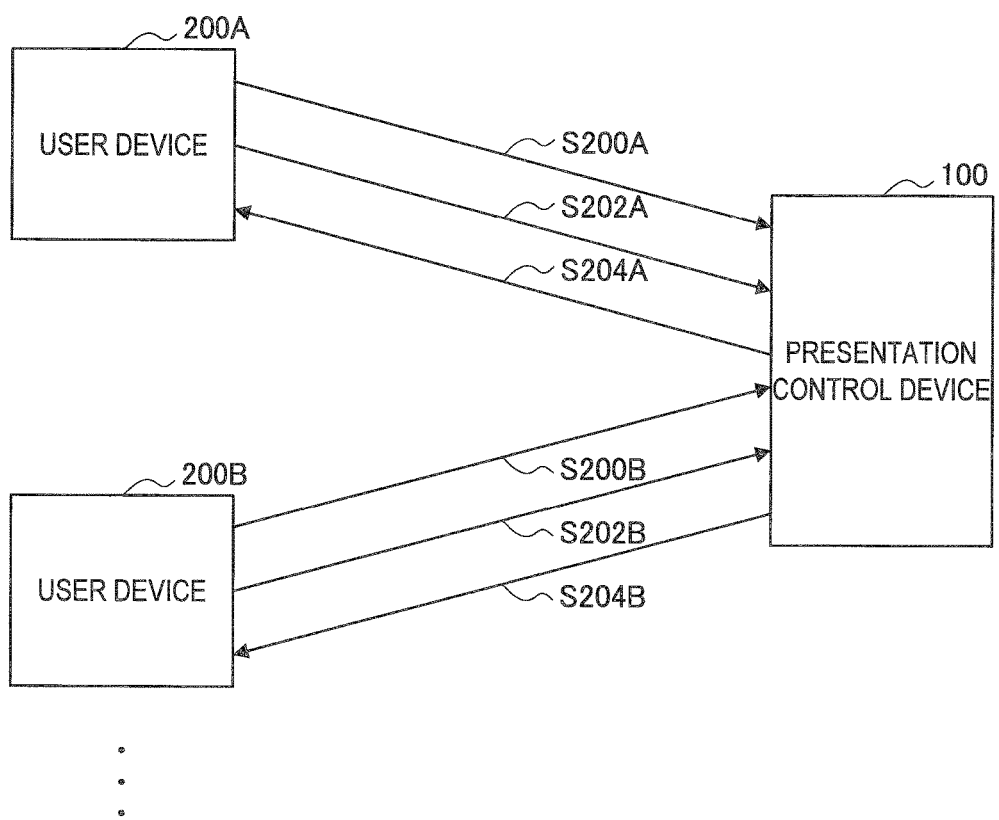
FIG. 16 is an illustration for describing an example of processing in a presentation control system in accordance with the present embodiment.

FIG. 16 is an illustration for describing an example of processing in a presentation control system 1000 in accordance with the present embodiment. The presentation control system 1000 includes the presentation control device 100, and user devices 200A and 200B (hereinafter may be collectively called a "user device 200"), for example. The presentation control device 100 and the user device 200 communicate with each other through a network (or directly), for example. In addition, the user device 200 includes the hardware configuration (including a configuration in accordance with a modification) shown in FIG. 15, for example.

The user device 200 transmits an image signal showing a photographed image to the presentation control device 100 (S200A and S200B), for example. Here, the user device 200 transmits an image signal to the presentation control device 100 at each time when a photographed image is created by photographing, for example, however, timing at which the user device 200 transmits an image signal is not limited to the above. For example, the user device 200 may transmit an image signal to the presentation control device 100 in a case where the number of photographed images (or the number of frames) becomes a predetermined threshold value or more, or becomes more than the predetermined threshold value.

In the steps S200A and S200B, a signal to be transmitted to the presentation control device 100 from the user device 200 is not limited to an image signal. For example, the user device 200 is capable of also transmitting meta data corresponding to a photographed image (if the user device 200 creates meta data), data showing a detection value of the motion detecting sensor, data showing a detection value of the position detecting device, and the like, to the presentation control device 100.

The user device 200 transmits a processing request to the presentation control device 100 (S202A and S202B), for example. Here, the processing request in accordance with the present embodiment includes a signal including a processing command for allowing the processing according to the methods of controlling presentation in accordance with the first to sixth examples to be performed, such as a search processing request for starting processing related to a search for a predetermined object, and the like, for example.

In the steps S202A and S202B, the presentation control device 100 receives the processing request transmitted from the user device 200, and performs processing corresponding to the processing request, and then transmits a signal corresponding to a processing result to the user device 200 corresponding to the processing request (S204A and S204B). Here, a signal corresponding to the processing result in accordance with the present embodiment, includes a control signal for controlling presentation, and data (such as image data, voice data, vibration pattern data) showing a presentation content, for example. In addition, for example, in a case where there is no photographed image for performing processing corresponding to the processing request, and in a case where an error occurs in the processing corresponding to the processing request, and the like, the presentation control device 100 may transmit a control signal of controlling presentation of a fact that the error occurs, and a signal showing data (such as image data and voice data) showing the fact that the error occurs, as a signal corresponding to the processing result.

In the steps S204A and S204B, the user device 200 receives the signal corresponding to the processing result transmitted from the presentation control device 100, and performs presentation based on the signal corresponding to the processing result, for example. The user device 200 presents a presentation content shown by data showing the presentation content included in the signal corresponding to the processing result by a presentation method and at presentation timing, shown by a control signal included in the signal corresponding to the processing result, by using a presentation device provided in the user device 200, or a presentation device connected to the user device 200, for example.

In the presentation control system 1000 in accordance with the present embodiment, for example. The processing shown in FIG. 16 is performed to realize presentation by the processing according to the method of controlling presentation in accordance with the present embodiment, described above (such as the processing according to the methods of controlling presentation in accordance with the first to sixth examples, described above). It is needless to say that the processing in the presentation control system 1000 is not limited to the example shown in FIG. 16.

As above, although an example of the presentation control device is described as the present embodiment, the present embodiment is not limited to the form described above. The present embodiment is applicable to various apparatus, such as a communication device (or an information processor) such as a mobile phone and a smartphone, a tablet type information processor, a video/music playing device (or a video/music recorder/playing device), a game machine, and a computer such as a personal computer (PC) and a server. In addition, the present embodiment is also applicable to a wearable device, such as "a display device of any shape, configured to have a screen in front of a user" such as an HMD and a monocle type device, and a watch type device. Further, the present embodiment is also applicable to a processing integrated circuit (IC) that can be incorporated into apparatuses like the above, and wearable devices like the above, for example.

In addition, although an example of the user device is described as the present embodiment, the present embodiment is not limited to the form described above. The present embodiment is applicable to various apparatus, such as a communication device (or an information processor) such as a mobile phone, a tablet type information processor, a video/music playing device (or a video/music recorder/playing device), a game machine, and a computer such as a PC. In addition, the present embodiment is also applicable to a wearable device, such as "a display device of any shape, configured to have a screen in front of a user" such as an HMD and a monocle type device, and a watch type device.

(A Program in Accordance with the Present Embodiment)

A program for allowing a computer to function as the presentation control device in accordance with the present embodiment is executed (such as a program capable of executing the processing according to the method of controlling presentation in accordance with the present embodiment, described above, such as the determination processing in accordance with the present embodiment, and the presentation control processing in accordance with the present embodiment) to enable the presentation corresponding to a recognition target to be recognized on the basis of a photographed image to be performed for a user.

In addition, the program for allowing a computer to function as the presentation control device in accordance with the present embodiment is executed on the computer so that it is possible to achieve an effect to be achieved by performing the processing according to the method of controlling presentation in accordance with the present embodiment, described above (such as the processing according to the methods of controlling presentation in accordance with the first to sixth examples, described above).

It should be understood by those skilled in the art that various modifications, combinations, sub-combinations and alterations may occur depending on design requirements and other factors insofar as they are within the scope of the appended claims or the equivalents thereof.

For example, although the description above shows that a program (computer program) is provided to allow a computer to function as the presentation control device in accordance with the present embodiment, the present embodiment may further provide a recording medium storing the program together.

The configuration described above shows an example of the present embodiment, so that the configuration obviously belongs to the technical scope of the present disclosure.

Additionally, the present technology may also be configured as below:

(1) A presentation control device including:
a determination section configured to determine whether a condition corresponding to a recognition target to be recognized on the basis of a photographed image is satisfied; and
a presentation control section configured to allow presentation associated with the recognition target to be performed in a case where it is determined that the condition corresponding to the recognition target is satisfied,
wherein the condition corresponding to the recognition target includes a condition related to a state of a target user to whom a content of the presentation is to be transmitted.

(2) The presentation control device according to (1),
wherein the condition corresponding to the recognition target further includes a condition related to an action history of the user.

(3) The presentation control device according to (2),
wherein the condition related to the action history of the user is a condition related to a lack of an article that the user possesses, and
wherein the determination section determines that the condition related to the lack of an article that the user possesses is satisfied in a case where the lack of an article that the user possesses is detected on the basis of history information related to the action history of the user and the photographed image, determines whether a condition related to a state of the user is satisfied in a case where it is determined that the condition related to the lack of an article that the user possesses is satisfied, and then determines that the condition corresponding to the recognition target is satisfied in a case where it is determined that the condition related to a state of the user is satisfied.

(4) The presentation control device according to (2),
wherein the condition related to the action history of the user is a condition related to a lack of an action of the user, and
wherein the determination section determines that the condition related to the lack of an action of the user is satisfied in a case where the lack of the action of the user is detected on the basis of history information related to the action history of the user and the photographed image, determines whether the condition related to a state of the user is satisfied in a case where it is determined that the condition related to the lack of an action of the user is satisfied, and then determines that the condition corresponding to the recognition target is satisfied in a case where it is determined that the condition related to a state of the user is satisfied.

(5) The presentation control device according to (3) or (4),
wherein the condition related to a state of the user is a condition related to whether a user takes a predetermined action, and
wherein the determination section estimates an action of the user on the basis of one or two or more of the photographed image, motion information showing a motion of the user and positional information showing a position of the user, and determines that the condition related to a state of the user is satisfied in a case where the estimated action of the user is the predetermined action.

(6) The presentation control device according to (5),
wherein a motion of the user shown by the motion information is detected by a motion detecting sensor.

(7) The presentation control device according to (5) or (6),
wherein a position of the user shown by the positional information is detected by a position detecting device.

(8) The presentation control device according to any one of (1) to (7),
wherein the condition corresponding to the recognition target includes a condition related to whether a photographed image includes a predetermined object,
wherein the condition related to a state of the user is a condition related to an action of the user, corresponding to the predetermined object, and
wherein the determination section determines that the condition corresponding to the recognition target is satisfied in a case where the predetermined object is detected from the photographed image, and an action of the user, corresponding to the predetermined object, is detected from the photographed image.
(9) The presentation control device according to (8),
wherein the condition corresponding to the recognition target further includes a condition of a circumstance related to the predetermined object, and
wherein the determination section determines that the condition corresponding to the recognition target is satisfied in a case where the condition of a circumstance related to the predetermined object is further satisfied.
(10) The presentation control device according to any one of (1) to (9),
wherein the presentation control section allows presentation corresponding to the condition corresponding to the recognition target, determined to be satisfied, to be performed.
(11) The presentation control device according to any one of (1) to (10),
wherein the photographed image is photographed with an imaging device worn by the user constantly, regularly, or irregularly.
(12) The presentation control device according to (11),
wherein the photographed image is photographed with each of a plurality of imaging devices worn by different users.
(13) The presentation control device according to any one of (1) to (12),
wherein the presentation control section composes a three-dimensional space image on the basis of a plurality of photographed images, and allows the presentation associated with the recognition target, using the three-dimensional space image, to be performed.
(14) The presentation control device according to any one of (1) to (12),
wherein the presentation control section composes a three-dimensional space image on the basis of a plurality of photographed images, and allows a virtual object to be displayed in the three-dimensional space image.
(15) The presentation control device according to any one of (1) to (14), further including:
a communication unit configured to communicate with an external device,
wherein the determination section determines whether a condition corresponding to a recognition target to be recognized on the basis of a photographed image received by the communication unit from the external device is satisfied.
(16) The presentation control device according to any one of (1) to (15), further including:
a communication unit configured to communicate with an external device,
wherein the presentation control section allows the external device to perform the presentation associated with the recognition target.
(17) The presentation control device according to any one of (1) to (16),
wherein the presentation control section allows a presentation device worn by the user to perform the presentation associated with the recognition target.
(18) A method of controlling presentation, the method including:
determining whether a condition corresponding to a recognition target to be recognized on the basis of a photographed image is satisfied; and
allowing presentation associated with the recognition target to be performed in a case where it is determined that the condition corresponding to the recognition target is satisfied,
wherein the condition corresponding to the recognition target includes a condition related to a state of a target user to whom a content of the presentation is to be transmitted.
(19) A program allowing a computer to execute:
determining whether a condition corresponding to a recognition target to be recognized on the basis of a photographed image is satisfied; and
allowing presentation associated with the recognition target to be performed in a case where it is determined that the condition corresponding to the recognition target is satisfied,
wherein the condition corresponding to the recognition target includes a condition related to a state of a target user to whom a content of the presentation is to be transmitted.

What is claimed is:
1. A presentation control device, comprising:
a determination section configured to:
determine that a first condition is satisfied,
wherein the first condition corresponds to a first user action from a plurality of estimated user actions;
recognize a recognition target based on a photographed image; and
determine that a second condition is satisfied, based on the determination that the first condition is satisfied,
wherein the second condition corresponds to the recognition target,
wherein the second condition includes a third condition related to a user action history,
wherein the user action history includes history information corresponding to at least one of the first user action or a second user action from the plurality of estimated user actions, and
wherein the first user action and the second user action are recognized, based on the photographed image; and
a presentation control section configured to allow a presentation associated with the recognition target, based on the determination that both of the first condition and the second condition are satisfied.
2. The presentation control device according to claim 1,
wherein the third condition is further related to a lack of possession of an article by a user of a user-wearable presentation device,
wherein the first user action and the second user action are actions of the user of the user-wearable presentation device, and
wherein the determination section is further configured to:
determine that the third condition is satisfied, based on a detection of the lack of possession of the article by the user,
wherein the detection of the lack of possession of the article by the user is based on the history information related to the user action history and the photographed image;
determine that the first condition is satisfied, based on the determination that the third condition is satisfied; and determine that the second condition is satisfied, based on the determination that the first condition is satisfied.

3. The presentation control device according to claim 1, wherein the third condition is further related to a lack of the second user action, and
wherein the determination section is further configured to:
determine that the third condition is satisfied, based on a detection of the lack of the second user action,
wherein the detection of the lack of the second user action is based on the history information related to the user action history and the photographed image;
determine that the first condition is satisfied, based on the determination that the third condition is satisfied; and
determine that the second condition is satisfied, based on the determination that the first condition is satisfied.

4. The presentation control device according to claim 2, wherein the first condition is a fourth condition related to a particular user action, and
wherein the determination section is further configured to:
estimate the first user action, based on at least one of the photographed image, motion information that represents a user motion, or positional information that represents a user position; and
determine that the first condition is satisfied, based on determination that the estimated first user action is the particular user action.

5. The presentation control device according to claim 4, further comprising:
a motion detecting sensor configured to detect the user motion.

6. The presentation control device according to claim 4, further comprising:
a position detecting device configured to detect the user position.

7. The presentation control device according to claim 1, wherein the second condition includes a fourth condition related to a detection of an object in the photographed image,
wherein the first condition is a fifth condition related to the first user action,
wherein the first user action is an action related to the detected object, and
wherein the determination section is further configured to determine that the second condition is satisfied, based on the detection of the object from the photographed image and the first user action.

8. The presentation control device according to claim 7, wherein the second condition further includes a sixth condition of a circumstance related to the object, and
wherein the determination section is further configured to determine that the second condition is satisfied, based on determination that the sixth condition is further satisfied.

9. The presentation control device according to claim 1, wherein the photographed image is a first image that is photographed with a user-wearable imaging device.

10. The presentation control device according to claim 9, wherein the photographed image is a second image that is photographed with at least one of a plurality of user-wearable imaging devices.

11. The presentation control device according to claim 1, wherein the presentation control section is further configured to:

compose a three-dimensional space image based on a plurality of photographed images, and
allow the presentation associated with the recognition target based on the composed three-dimensional space image.

12. The presentation control device according to claim 1, wherein the presentation control section is further configured to:
compose a three-dimensional space image based on a plurality of photographed images, and
allow display of a virtual object in the composed three-dimensional space image.

13. The presentation control device according to claim 1, further comprising:
a communication unit configured to communicate with an external device,
wherein the determination section is further configured to determine the second condition, based on the photographed image received by the communication unit from the external device, is satisfied.

14. The presentation control device according to claim 1, further comprising:
a communication unit configured to communicate with an external device,
wherein the presentation control section is further configured to allow the external device for the presentation associated with the recognition target.

15. The presentation control device according to claim 1, wherein the presentation control section is further configured to allow the presentation associated with the recognition target by a user-wearable presentation device.

16. A method, comprising:
in a presentation control device:
determining that a first condition is satisfied,
wherein the first condition corresponds to a first user action from a plurality of estimated user actions;
recognizing a recognition target based on a photographed image;
determining that a second condition is satisfied, based on the determination that the first condition is satisfied,
wherein the second condition corresponds to the recognition target,
wherein the second condition includes a third condition related to a user action history,
wherein the user action history includes history information corresponding to at least one of the first user action or a second user action from the plurality of estimated user actions, and
wherein the first user action and the second user action are recognized, based on the photographed image; and
allowing a presentation associated with the recognition target, based on the determination that both of the first condition and the second condition are satisfied.

17. A non-transitory computer-readable medium having stored thereon, computer-executable instructions for causing a computer to execute operations, the operations comprising:
determining that a first condition is satisfied,
wherein the first condition corresponds to a first user action from a plurality of estimated user actions;
recognizing a recognition target based on a photographed image;
determining that a second condition is satisfied, based on the determination that the first condition is satisfied, wherein the second condition corresponds to the recognition target,
wherein the second condition includes a third condition related to a user action history,
wherein the user action history includes history information corresponding to at least one of the first user action or a second user action from the plurality of estimated user actions, and
wherein the first user action and the second user action are recognized, based on the photographed image; and allowing a presentation associated with the recognition target, based on the determination that both of the first condition and the second condition are satisfied.

* * * * *